United States Patent [19]
SooHoo et al.

[11] Patent Number: 5,112,128
[45] Date of Patent: May 12, 1992

[54] SOURCED LOCKED FREQUENCY MODULATED DUAL SERVO PRLG

[75] Inventors: Kie L. SooHoo; James H. Doty, both of Anaheim; Paul H. Ito, Los Angeles, all of Calif.

[73] Assignee: Rockwell International Corporation, El Segundo, Calif.

[21] Appl. No.: 281,422

[22] Filed: Dec. 8, 1988

Related U.S. Application Data

[63] Continuation-in-part of Ser. No. 77,134, Jul. 23, 1987, abandoned.

[51] Int. Cl.⁵ .............................................. G01C 19/64
[52] U.S. Cl. .................................. 356/350; 372/94
[58] Field of Search ........................ 356/350; 372/94

[56] References Cited

U.S. PATENT DOCUMENTS

| 4,135,822 | 1/1979 | Ezekiel | 356/350 |
| 4,352,562 | 10/1982 | Minden | 356/350 |
| 4,673,293 | 6/1987 | Sanders | 356/350 |

Primary Examiner—Vincent P. McGraw
Assistant Examiner—S. A. Turner
Attorney, Agent, or Firm—H. Fredrick Hamann; George A. Montanye; Tom Streeter

[57] ABSTRACT

A passive ring resonator gyroscope comprising a single piece body having an integral first and second resonator cavity. The first resonator cavity contains a single frequency laser that provides a sharply tuned single frequency light source to the second resonator cavity. The single frequency light source is split to form first and second sources. The second resonator cavity is a passive high Q cavity with a closed second optical path. The two light sources are fed into the second resonator and propagate as CW and CCW beams within the second resonator. A first servo channel develops a first control signal to tune the frequency of the CW beam to a resonance peak. A second servo channel develops a second control signal to tune the CCW beam to its resonance peak. By converting both servo error outputs into frequency, the relative frequency difference between the CW and CCW beams are recorded as the frequency shift in response to the body rate rotation about the sensitive axis. The first and second control signals are algebraically added to provide a linear laser difference servo signal which is integrated, to provide a passive cavity servo signal or, in an alternative embodiment, a laser cavity servo signal. The passive cavity servo signal is used to drive a passive cavity PZT to tune the passive cavity to be resonant at a center frequency midrange between the first and second offset frequencies. In the alternative embodiment, the cavity servo signal is used to adjust the linear laser path length to keep the linear laser center frequency at a frequency midrange between the first and second offset frequencies.

18 Claims, 13 Drawing Sheets

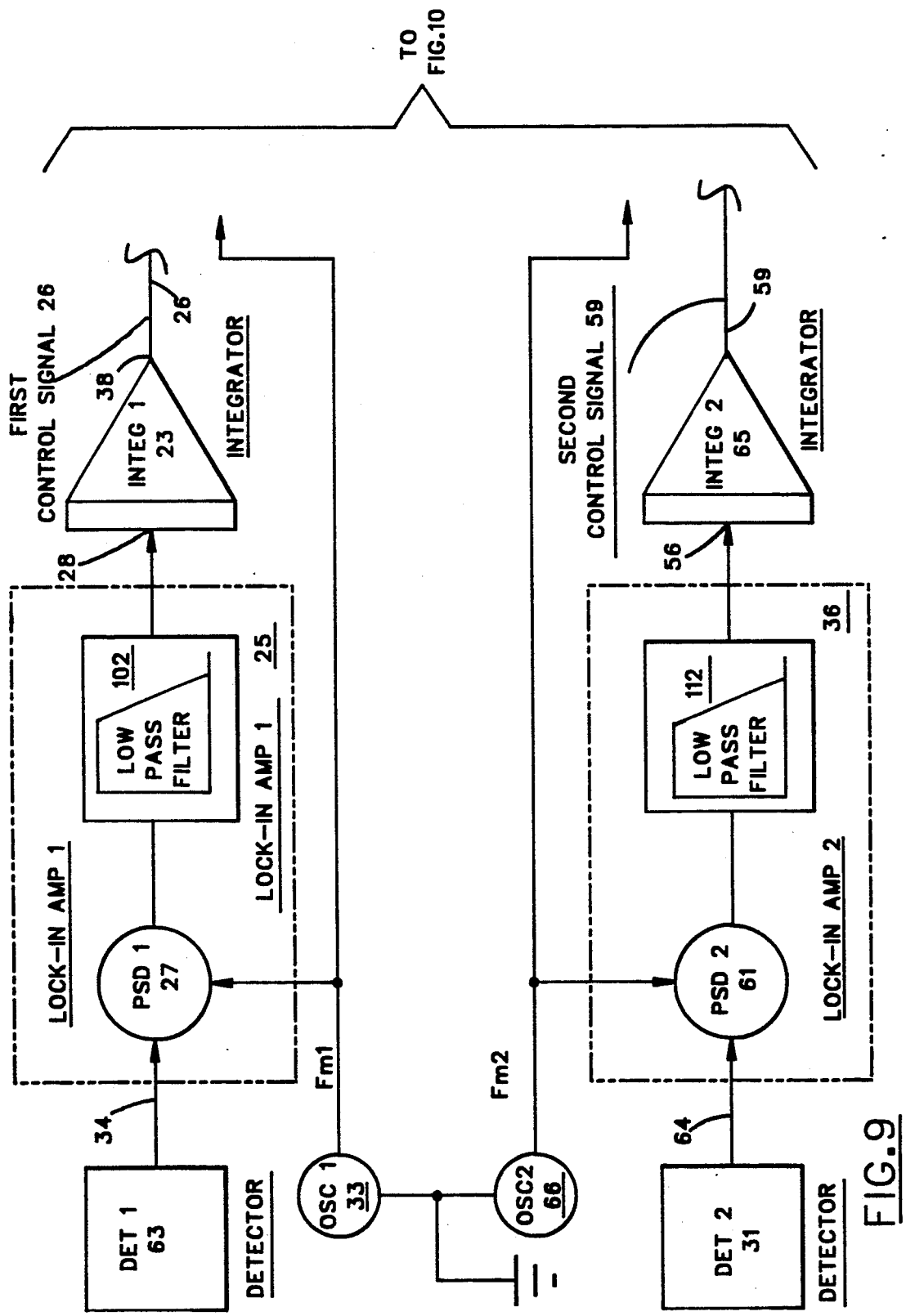

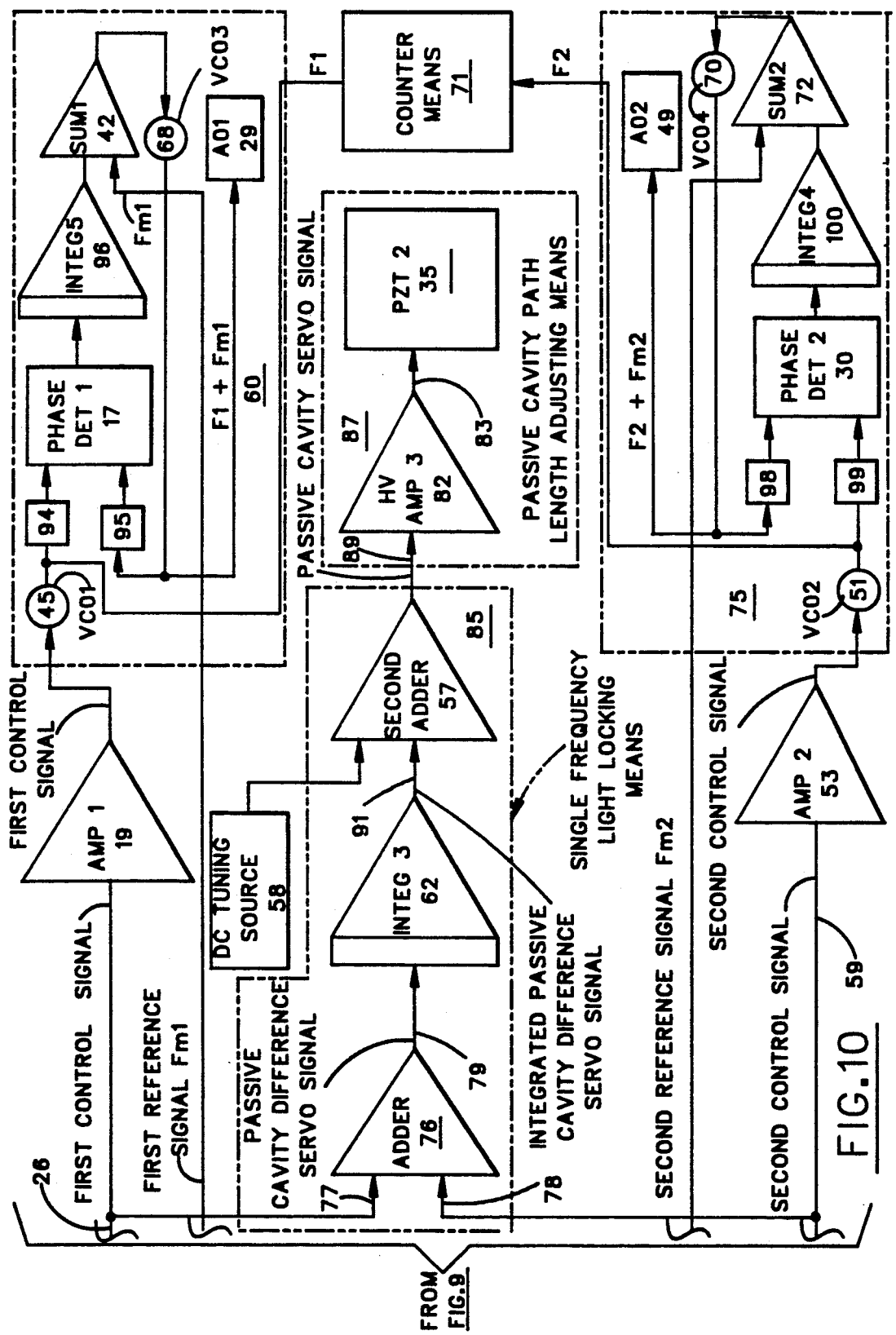

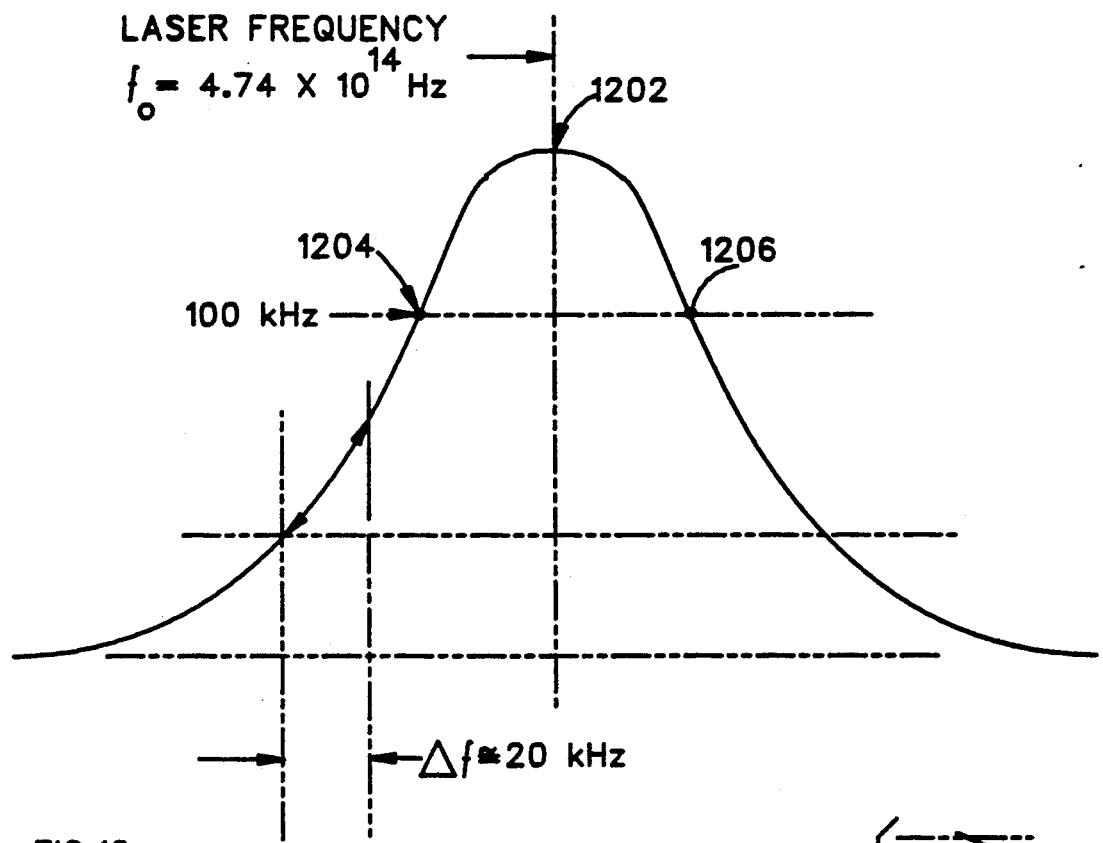
FIG.12a
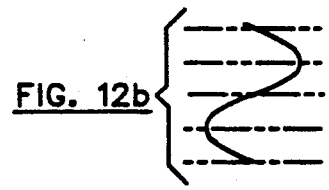
FIG. 12b
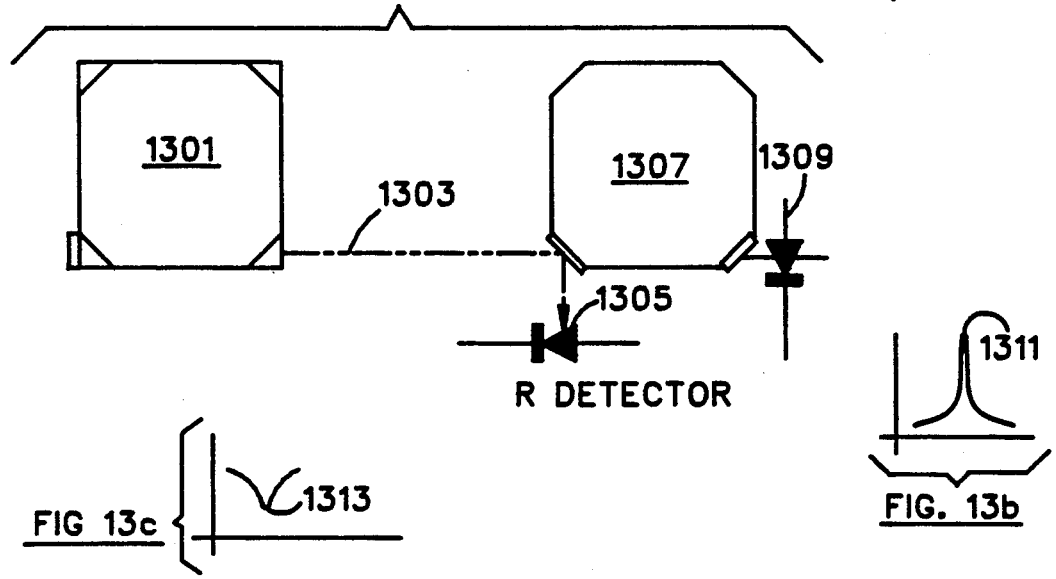
FIG.13a
FIG. 13b
FIG 13c

SOURCED LOCKED FREQUENCY MODULATED DUAL SERVO PRLG

This application is a continuation-in-part application under 35 USC 120 from a parent application titled "Balanced Dual Servo frequency Modulated VCO Passive Ring Laser Gyroscope", Ser. No. 077,134, filed Jul. 23, 1987 and now abandoned, having inventors Kie L. SooHoo and James H. Doty and having a common assignee, the contents of which is incorporated herein by reference.

BACKGROUND OF THE INVENTION

1. Field of the Invention

The present invention relates to optical gyroscopes and more particularly to passive ring resonator gyroscopes which have bias and frequency errors resulting from mechanically or thermally induced dimensional changes

2. Description of Related Applications and Patents

This application reltates to seven previously submitted applications:

Ser. No. 676,322, "PASSIVE RING RESONATOR GYROSCOPE", filed Nov. 29, 1984, inventor Sanders et al;

Ser. No. 701,891, "TWO SERVO LOOP PASSIVE RING LASER GYROSCOPE", filed Feb. 13, 1985, inventors SooHoo and Valle;

Ser. No. 839,292, "TWO SOURCE LASER PASSIVE RING LASER GYROSCOPE", filed Mar. 13, 1986, inventor SooHoo; issued Feb. 28, 1989, U.S. Pat. No. 4,807,999;

Ser. No. 864,232, "PHASE LOCKED PASSIVE RING LASER GYROSCOPE", filed May 19, 1986, inventor SooHoo; issue Mar. 28, 1989, U.S. Pat. No. 4,815, 851;

Ser. No. 028,033, "IDENTICAL SERVO FREQUENCY MODULATED PASSIVE RING LASER GYROSCOPE", filed Mar. 23, 1987, inventor SooHoo;

Ser. No. 044,921, "BALANCED DUAL SERVO VCO PASSIVE RING LASER GYROSCOPE", filed May 01, 1987, inventor SooHoo; issued May 16, 1989, U.S. Pat. No. 4,830,495;

Ser. No. 077,134, "BALANCED DUAL SERVO FREQUENCY MODULATED VCO PASSIVE RING LASER GYROSCOPE", filed Jul. 23, 1987, inventors SooHoo and Doty.

This application was abnadoned sunsequent to filing this application.

Each of the above related applications have a common assignee.

All seven of these applications, describe a laser gyro having a single piece body incorporating a linear laser light source and a passive resonant cavity.

This first applicaiton, Ser. No. 676,322, relies on three active servo loops for operation.

The second previous application, Ser, No. 701,891, describes a gyroscope having a single linear laser light source and a passive resonant cavity. This seond gyro uses a first and second active servo loop for operation.

The third application, Ser. No. 839,292 describes a gyroscope having two laser sources. A first laser source produces a clockwise beam and a second laser source produces a counterclockwise beam. Both beans circulating in a sealed, evacuated passive cavity within the same body.

The fourth application, Ser. No. 864,232 describes a gyroscope using an external modulator to frequency modulate the input source beam and subsequently the detected clockwise and counterclockwise beams are demodulated at this same frequency to produce a more sensitive phase detection scheme.

The fifth application, Ser. No. 028,033, describes a gyroscope using an external modulator to frequency modulate the input beam and the output beams are phase demodulated at this same frequency. In this application, two identical servo loops plus a cavity sum servo are used to create a more symmetric and sensitive servo system.

The sixth application, Ser. No. 044,921, describes a gyroscope having two identical balanced servo loops plus a cavity servo based on a PZT dither on the passive cavity.

The parent application, Ser. No. 077,134 describes a gyroscope with different frequency modulations applied to the two acousto-optic modulators. In this application two identical servo loops plus a cavity sum servo are used to create a symmetric servo system.

DESCRIPTION OF PRIOR ART

In a passive ring resonator gyroscope, a pair of monochromatic light beams counterpropagate about a closed-loop optical path, which forms a high Q resonant optical circuit. The stability of the path length between reflective surfaces forming the closed path is cirtical in maintaining resonance in the passive ring resonator cavity since dimensional changes contribute to bias frequency errors. A linear laser and a ring resonator are combined to from a prior art passive ring resonator gyro in an article by S. EZEKIEL and S. R. BALSAMO titled "A Passive Ring Laser Gyroscope", *Applied Physics Letters*, Vol. 30, No. 9, 1 May 1977, pg. 478–480. A linear resonator is typically conceived as a linear or standing wave resonator with forward and backward waves in which a light completes an optical round trip by reflecting off a mirror and retracing its path. The forward and backward waves create a standing wave in the cavity. In a ring resonator, each light completes and optical round trip without retracing its path and hence the path encloses an area as shown in Ezekiel's paper.

A description of lasers and resonators is found in texts such as those by Yarvi, A., *QUANTUM ELECTRONICS* (John Wiley & Sons. 1975) or Sargent, M., et.al., and *LASER PHYSICS* published by Addison-Wesley Pub., 1974.

In the passive ring resonator, such as that described in the EZEKIEL reference, two beams traveling in opposite directions around the closed-loop optical path are injected into the passive ring resonator from a single frequency light source. The single frequency light source for the passive resonator is typically an external linear laser. Spectra Physics Inc. of Sunnyvale, Calif. produces stabilized lasers with the required characteristics. As the ring resonator gyroscope cavity rotates in inertial space, the two counterpropagating beams travel unequal path lengths. This path difference, due to rotation in inertial space, gives rise to a relative frequency difference commonly referred to as the Sagnac effect between the two counterpropagating beams. A discussion of the Sagnac effect is found in publications such as that published by J. Post, "Sagnac Effect", *Review of Modern Physics*, Vol. 39, No. 2, Apr. 1967, 475–493.

A ring resonator, as opposed to a linear resonator, can exhibit the Sagnac effect and detect inertial rotation. The relative frequency difference is detected as a changing interference fringe pattern which is then electronically interpreted to indicate the direction and inertial rate of rotation of the passive gyro about the gyro's sensitive axis. The sensitive axis of the gyro is along the direction normal to the plane of the passive resonator.

It is known that bias errors in the detected signal of a ring resonator gyron result from dimensional changes in the laser and in the passive ring resonator. Bias errors also result from Fresnel Drag; these errors arise from the presence of gases (e.g. air) in the path of the counterpropagating beams in the resonator. Bias errors are typically characterized as a frequency difference between the two light beams which is not related to the rotation rate. Bias errors are sometimes detected as a frequency difference in the absence of rotation or as post calibration changes in the frequency difference for a specific absolute inertial rotation rate.

The Passive Ring Resonator Gyroscope of the type described in the EZEKIEL reference is typical constructed by placing optical elements, such as mirrors, beamsplitter, etc. on an optical bench. The location, spacing and geometrical relationships between the elements of the gyro function to enhance the passive ring resonator gyroscope's sensitivity and stability. Experimental passive ring resonator gyroscopes, such as that described in the EZEKIEL reference, typically have path lengths of a few meters making them unsuitable for use as a navigational instrument. The large size of prior art passive ring resonator gyroscopes, such as that characterized in the EZEKIEL reference, also contributes to the likelihood of bias errors due to mechanical coupling and mechanical drift of the optical elements in response to physical and thermal forces acting on the laser and on the cavity optical table or bench.

U.S. Pat. No. 4,352,562 issued Oct. 5, 1982, inventor H. T. Minden, is related and of interest. However, Minden does not teach or suggest the use of an integral body gyro. The invention of Minden, as taught, will not work without several modifications. The minden apparauts has no DC coarse tuning mechanism and is not symmetrical in its system of organization. As a result of the asymmetry of the Minden apparatus, the two differential amplifiers do not have the same common mode rejection of the nose and drift on the CE and CCW signals, In addition to the above disadvantage, one beam goes through two AO cells, further reducing the efficiency and laser output of the whole Minden system.

Japanese Patent No. 53-146587, for a Laser Gyro issued Dec. 20, 1978 is of interest because it refers to an optical resonator and a laser beam.

SUMMARY OF THE INVENTION

The objective of this invention is to provide a frequency locked passive ring resonator gyro suitable for use as a navigational instrument having reduced bias errors and bias error sensitivity while having substantially enhanced stability and sensitivity. This is accomplished by constructing a gyro having a single source laser and a passive ring resonator within a single housing or one piece body in which the total resonator path length is substantially below a half meter.

Another objective of this invention is to provide a single source passive ring laser gyroscope having two fixed frequency reference signal sources providing two reference signals to respective identical lock-in servos for peaking the intensity of the CW (clockwise) and CCW (counterclockwise) propagating light beams in the passive cavity.

The invention changes the passive cavity's path length with a control signal to match the passive cavity's resonance to the center frequency of the active laser in the absence of any body rate input.

A particular embodiment of this innovative passive ring resonator gyroscope has a single piece body, typically fabricated from a block of glass ceramic material.

In a more particular alternative embodiment, a laser uses a laser resonator cavity with a transmitting optical port for transmitting stabilized single frequency light to the passive resonator cavity. The output of the single frequency light sources is directed through at least one transmitting optical port of the laser resonator.

The passive resonator cavity and its reflective elements form a passive high Q cavity having a closed optical path tuned to resonate at substantially the same frequency as the laser resonator cavity. Means are provided for splitting this source into first and second rays and coupling the first and second rays into the passive passive resonator cavity, thereby forming CW and CCW light beams in the passive resonator. These means are implemented using conventional beamsplitters, mirrors, and lenses.

Bias errors are diminished since the passive ring resonator is a passive device and has no internal excitation to frequency shift the cavity resonances. Bias errors due to axial gas flow or Fresnel drag is eliminated since the second resonator is evacuated. Taken together, these features form a gyroscope with increased stability and reduced bias errors.

The laser cavity has a laser cavity path length adjusting means such as a piezoelectric transducer responsive to the laser cavity path length control signal for shifting the resonant frequency of the laser cavity.

As light leaves the source laser, it is divided into a first and second single frequency ray by a beamsplitter. The frequency of the first beam is upshifted by an acousto-optic modulator (A01) driven by a voltage controlled oscillator (VC01) at a frist offset frequency. F1 plus a first reference frequency Fm1 to provide a first propagating light ray which is injected into the passive resonator cavity to form a clockwise beam (FCW).

The frequency of the second beam is also upshifted in frequency by an acousto-optic modulator (A02) driven by voltage controlled oscillator VC02 at a second offset frequency plus frequency F2 into the second resonator. The second beam is also frequency modulated at a second reference frequency Fm2 from a second reference oscillator to provide a second frequency dither used in the stabilization loop. A wider system bandwidth is obtained by injecting the dither signal via the AO devices instead of a PZT because AO devices typically have a higher bandwidth than that achievable with a PZT. The invention RLG anticipates raising the dither frequency from a range of (1-5 kHz) to a much higher frequency dither (>10 kHz). The present invention will modulate the injected CW and CCW beams at frequencies above 10 kHZ with a a corresponding increase in servo loop bandwidth. Response timing transient response and acceleration capabilities are improved due to this larger bandwidth.

A first VCO adjusts its output frequency in response to a first servo control signal and adds enough of a frequency increase to the propagating light beam to shift the center frequency of the FCW beam entering the passive cavity (passive resonator) to the line width resonant point. A portion of the FCW beam is extracted from the resonator and a photodetector responds to the intensity signal. The intensity signal thus extracted is coupled to a first phase sensitive detector, also referenced to the first reference oscillator. If the upshifted light source, FCW, is above or below the line center of the CW cavity resonance, the first phase sensitive detector develops a first error signal with a magnitude related to the FCW frequency error and a polarity related to the position of the error above or below the cavity's CW peak resonance.

The second VCO adjusts its output frequency in response to a second servo control signal and adds enough of a frequency increase to the counterpropagating light beam to shift the center frequency of the FCCW beam entering the passive resonator cavity to the line width resonant point. A portion of the FCCW beam is extracted from the resonator and a photodetector responds to the intensity signal. The intensity signal thus extracted is coupled to a second phase sensitive detector, also referenced to the second reference oscillator. If the upshifted light source, FCCW, is above or below the line center of the CCW cavity resonance, the second phase sensitive detector develops an error signal with a magnitude related to the FCCW frequency error and a polarity related to the position of the error above or below the cavity's FCCW peak resonance.

The need for mechanically dithering the resonator cavity is eliminated by superimposing a signal component at frequency Fm1 onto the FCW beam and a component of Fm2 onto the FCCW beam.

The first and second control signals are summed to provide a passive cavity difference signal which is integrated and used to drive a passive cavity piezoelectric transducer to move the resonance of the passive resonator to equalize the first and second offset frequencies F1 and F2, respectively.

A counter means detects the frequency difference between a clockwise upshift VCO1 oscillator and a counterclockwise VCO2 upshift oscillator to provide a signal representing a measure of the input body rate.

In another alternative embodiment, the passive cavity difference servo signal is integrated to form an integrated linear laser difference servo signal that error is applied to the source laser's PZT instead of the passive cavity's PZT, thereby eliminating one DC servo loop and also minimizing the thermal drift and frequency fluctuations associated with two separate cavities.

A DC bias is applied to the cavity's PZT to bring the peak resonance of the passive cavity near the peak power resonance of the laser cavity's gain medium. When the path length servo is locked, the cavity is locked to the peak of the laser's gain output.

BREIF DESCRIPTION OF THE DRAWINGS

FIG. 9 is an expanded diagram of the left portion of the passive cavity electronics of FIG. 8.

FIG. 10 is an expanded diagram of the right portion of the passive cavity electronics of FIG. 8.

FIG. 12a shows a waveform depicting the response characteristic and center frequency of a passive resonator for use with a HeNe laser.

FIG. 12b is a sinusoidal wave form illustrating a typical modulation range used in conjunction with a HeNe laser synchronous demodulator system, by a projection onto FIG. 11a.

FIG. 13a-c shows the relative position of two detector diodes in relation to a laser source on the left and a passive cavity on the right.

Figure 14:
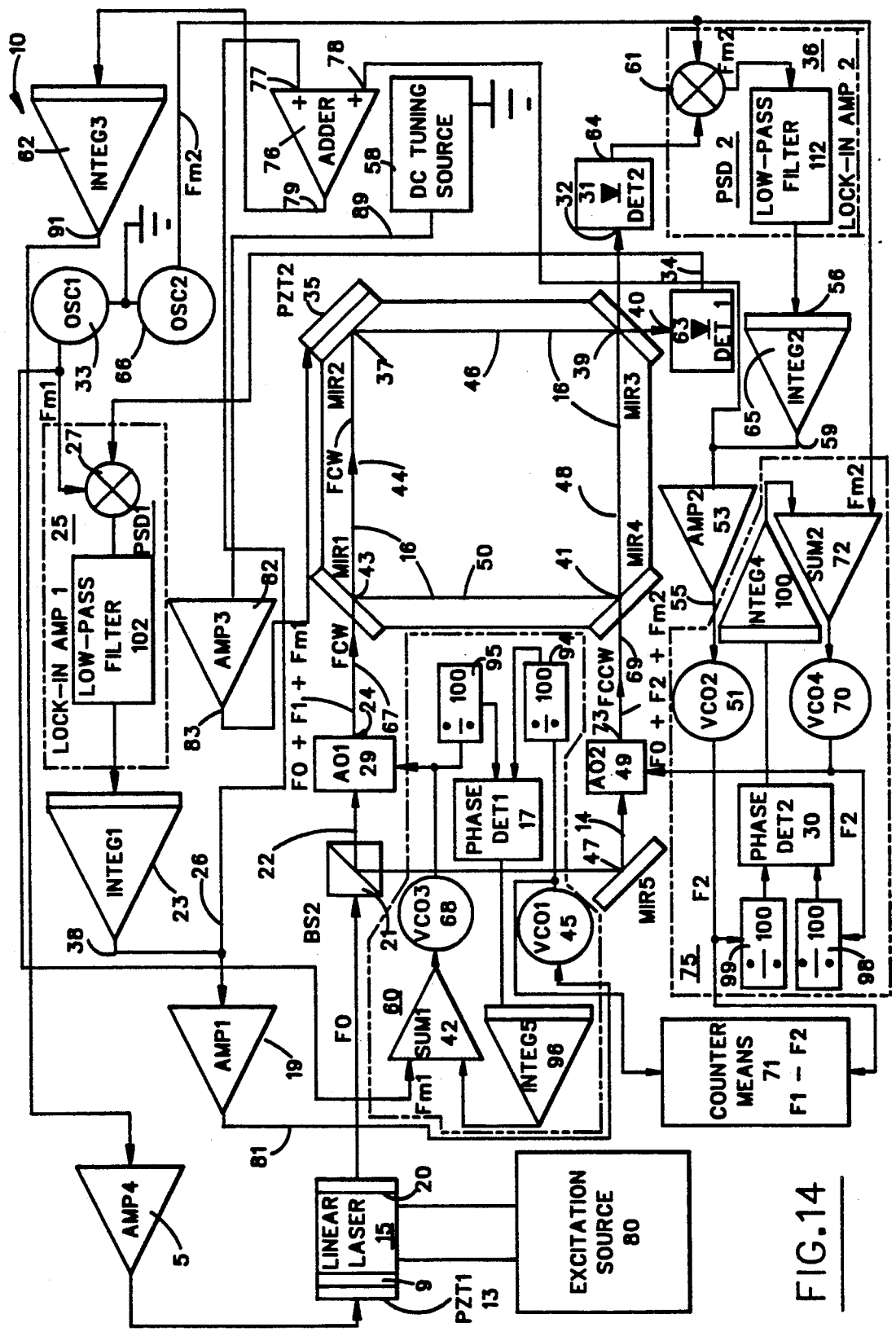

FIG. 14 is a schematic and block diagram of an alternative embodiment of the passive ring resonator gyroscope showing two servos locking the passive resonator to its resonances and the linear laser frequency being controlled by the integrated linear laser difference servo signal and locked to the resonant frequency of the passive cavity.

DESCRIPTION OF THE PREFERRED EMBODIMENT

Figure 1:
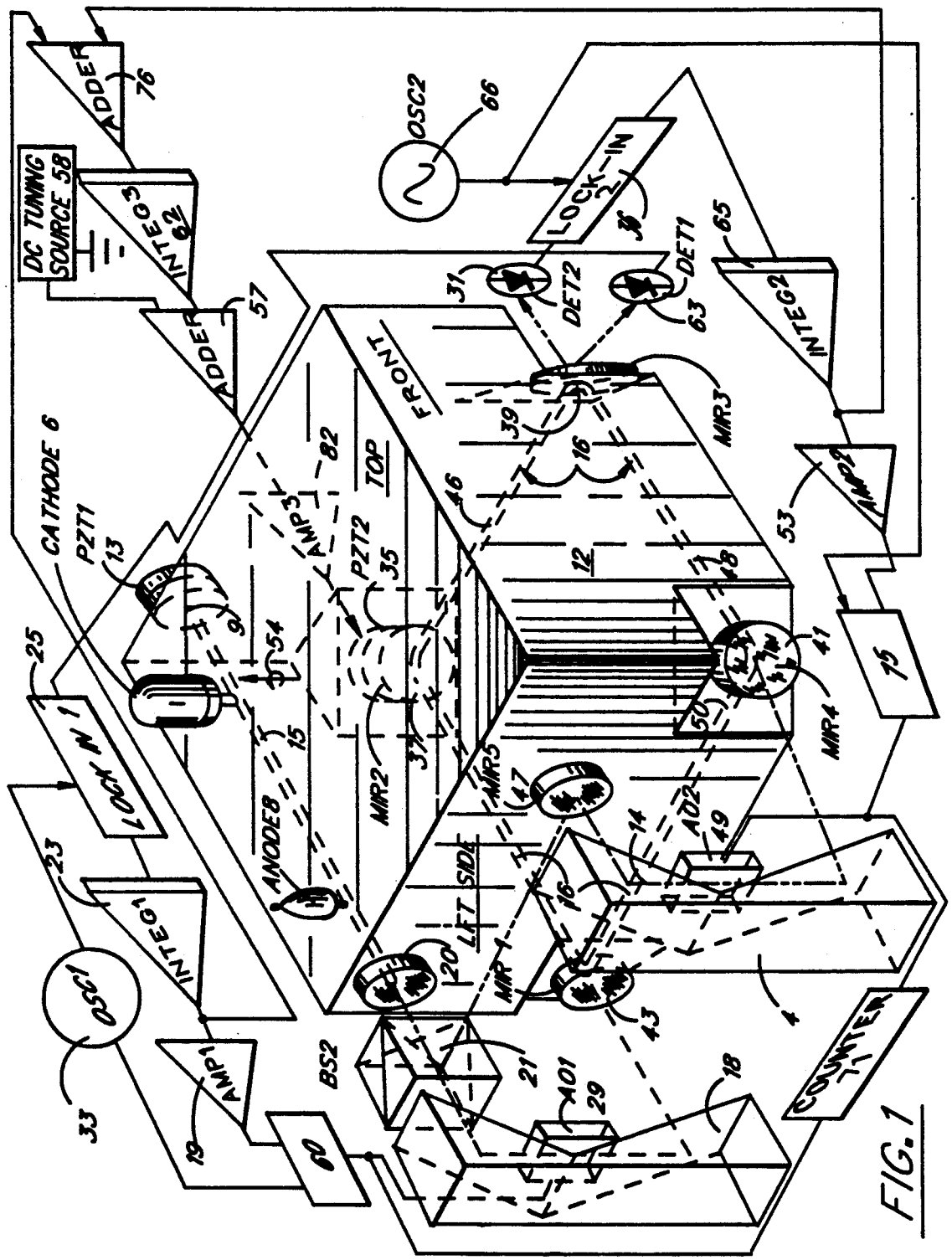
FIG. 1 is a perspective view of the passive ring resonator gyroscope.
Figure 2:
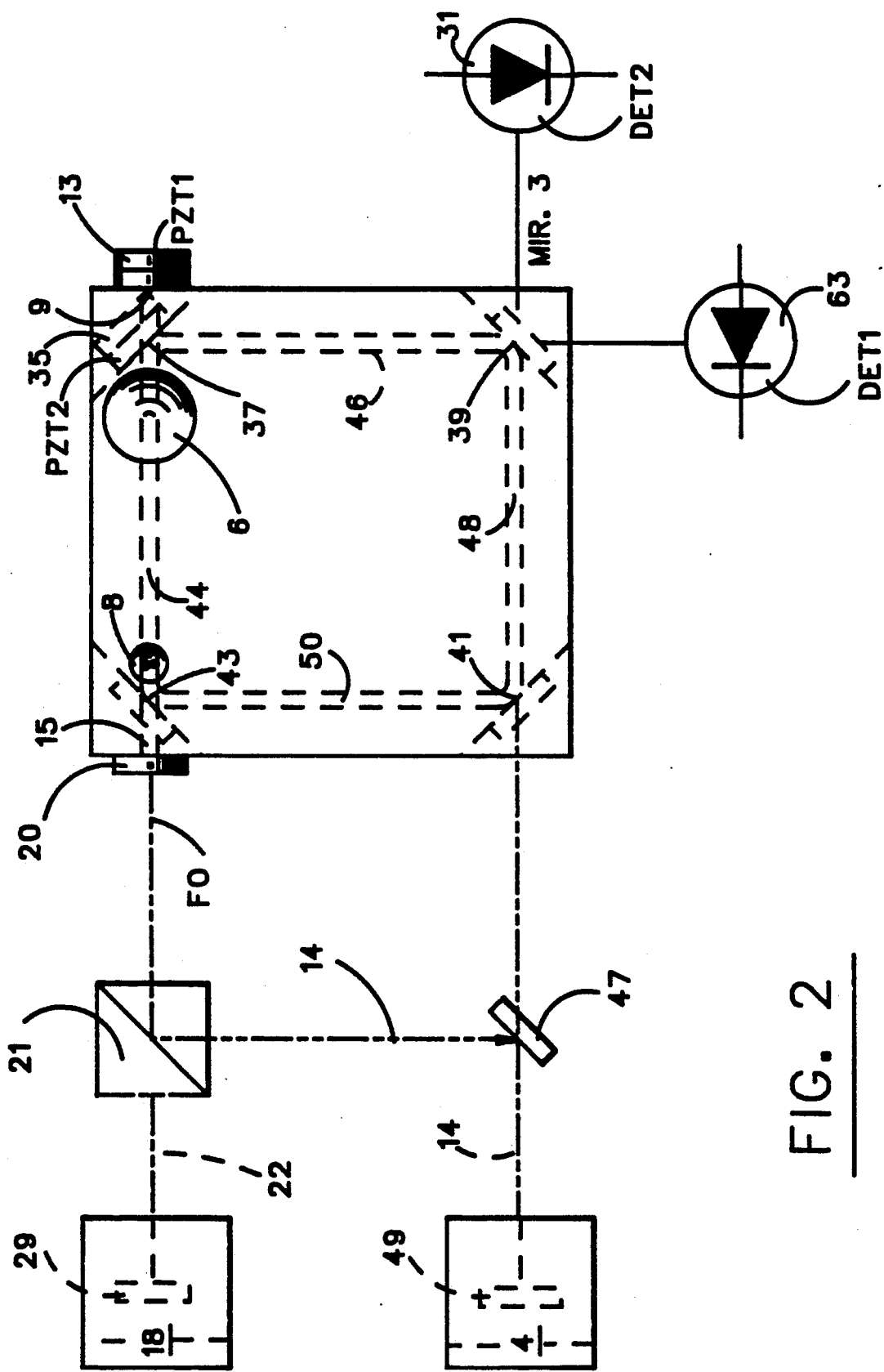
FIG. 2 is a top planar view of the passive ring resonator gyroscope body.

FIG. 1 shows the invention, passive ring resonator gyroscope (PRLG). The invention passive ring resonator gyroscope 10 is depicted having a single piece body 12 having integral first, and second resonator cavities 15, 16. The term "integral" is meant to convey the idea that the body 12 is formed from one homogenous piece of material such as ZERODUR ®, (a trademark of the JENA$^{ER}$ GLASSWERK SCHOTT & GEN. of MAINZ, GERMANY), which forms a fixed reference frame for all required optical elements, including first and second resonator cavities. A laser means is composed of a straight laser such as the laser using cavity 15 or an "L" shaped laser. When operated with suitable excitation, the linear laser providing a source of single mode TEM$_{oo}$, single frequency light for the second passive resonator cavity.

Figure 7:
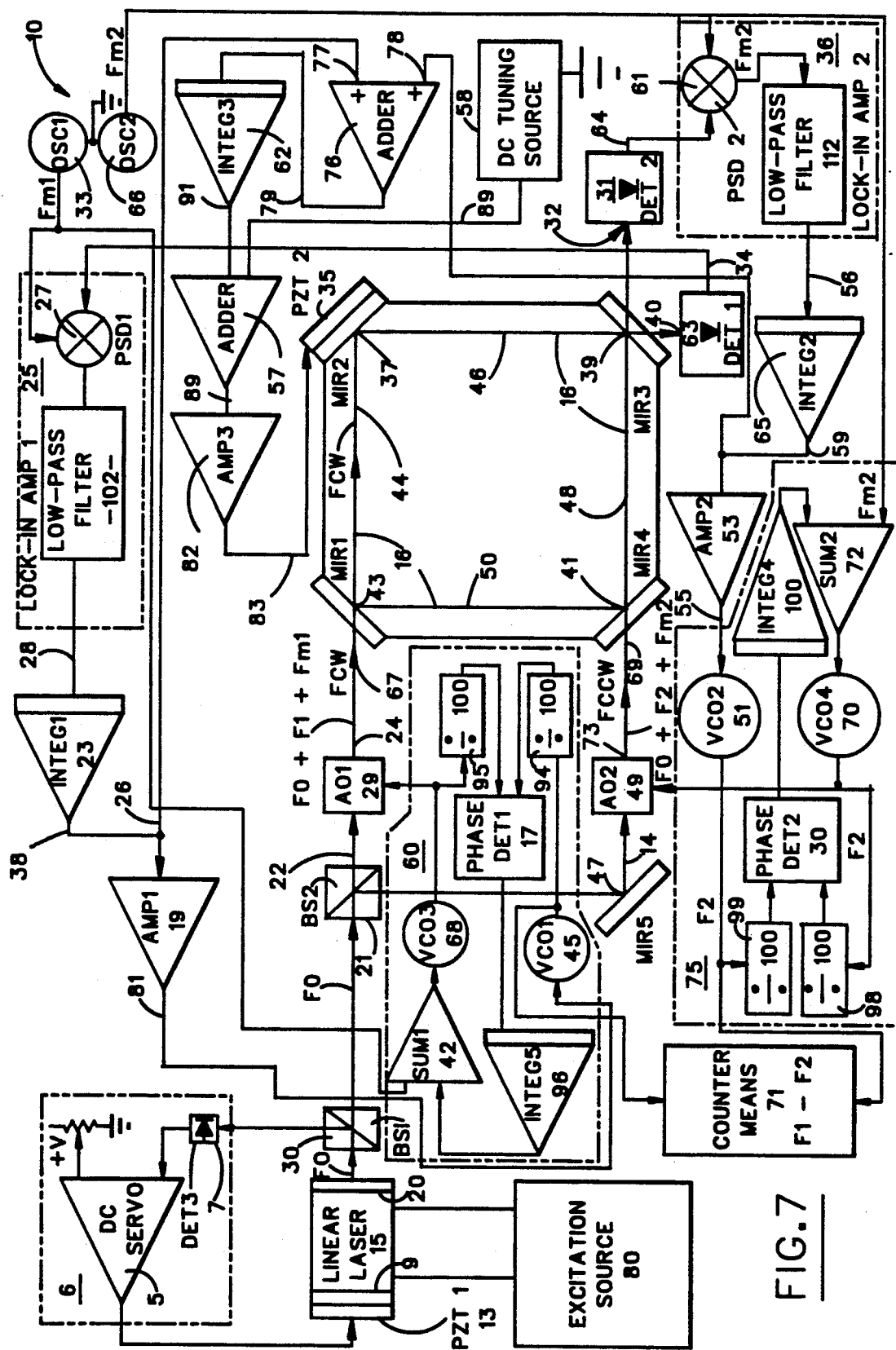
FIG. 7 is a schematic and block diagram of the passive ring resonator gyroscope showing two servo loops with the resonant frequency of the passive resonator being controlled by the passive cavity servo signal and the linear laser having its own control loop.

FIG. 7 shows laser cavity 15 and a passive resonator cavity designated by line segments 16 that is a passive high Q evacuated cavity.

A laser means such as the LINEAR LASER block shown in FIG. 7 has a power source 80. The LINEAR LASER uses the laser resonator cavity 15 which contains a lasing medium such as a mixture of Helium and Neon.

FIG. 7 shows the laser piezoeletric transducer (PZT1) 13 with a mirror surface 9 positioned within the linear laser cavity 15 to adjust the pathlength of reflected light within the laser cavity 15. PZT1 13 responds to the laser cavity servo signal from the DC servo 5 to adjust the output intensity of the single frequency light to peak intensity leaving said linear laser cavity at frequency F0.

The linear laser provides light at a single frequency F0 via partially transmissive mirror 20 to BS1 30 where a small portion of the single frequency light is split off and directed to detector DET3, 7, while the remainder of the single frequency light is directed to BS2, 21. The beam passes through BS2 to form first and second single frequency rays 22, 14, respectively, each having a center frequency, F0. DET3 7 is a conventional detector such as that described later in connection with DET1 and DET2. Each of these detector units typically contain a reversed biased PIN diode and a low noise preamplifier. A detector such as the SD-00-12-12-231 manufactured by the Silicon Detector Corp. of Newbury Park, Calif. is suitable for use with a Helium Neon laser light source.

Phantom block 6 represents a laser cavity servo that adjusts the laser cavity servo signal at the output of DC servo to peak the amplitude of the single frequency light source at frequency F0 as it is sensed by DET3 7 after leaving the transmitting aperture through partially transmissive mirror 20. The output of the linear laser is not influenced by inertial rate inputs to the gyroscope.

The passive resonator cavity 16 has a passive cavity path length adjusting means (PZT2)35 that is responsive to a laser cavity servo signal from a single frequency light locking means such as that represented in FIG. 7 by AMP3 82, ADDER 57, INTEG3 62 and ADDER 76. The resonant frequency of the passive resonator cavity 16 follows the linear laser's resonant frequency because the passive cavity control signal to PZT2 35 is obtained by sampling and maintaining the counterpropagating light FCW, FCCW at peak resonance within the cavity 16 via the passive cavity servo means. PZT2 has an input terminal coupled via a signal line 83 to the output of AMP3, 82.

Figure 3:
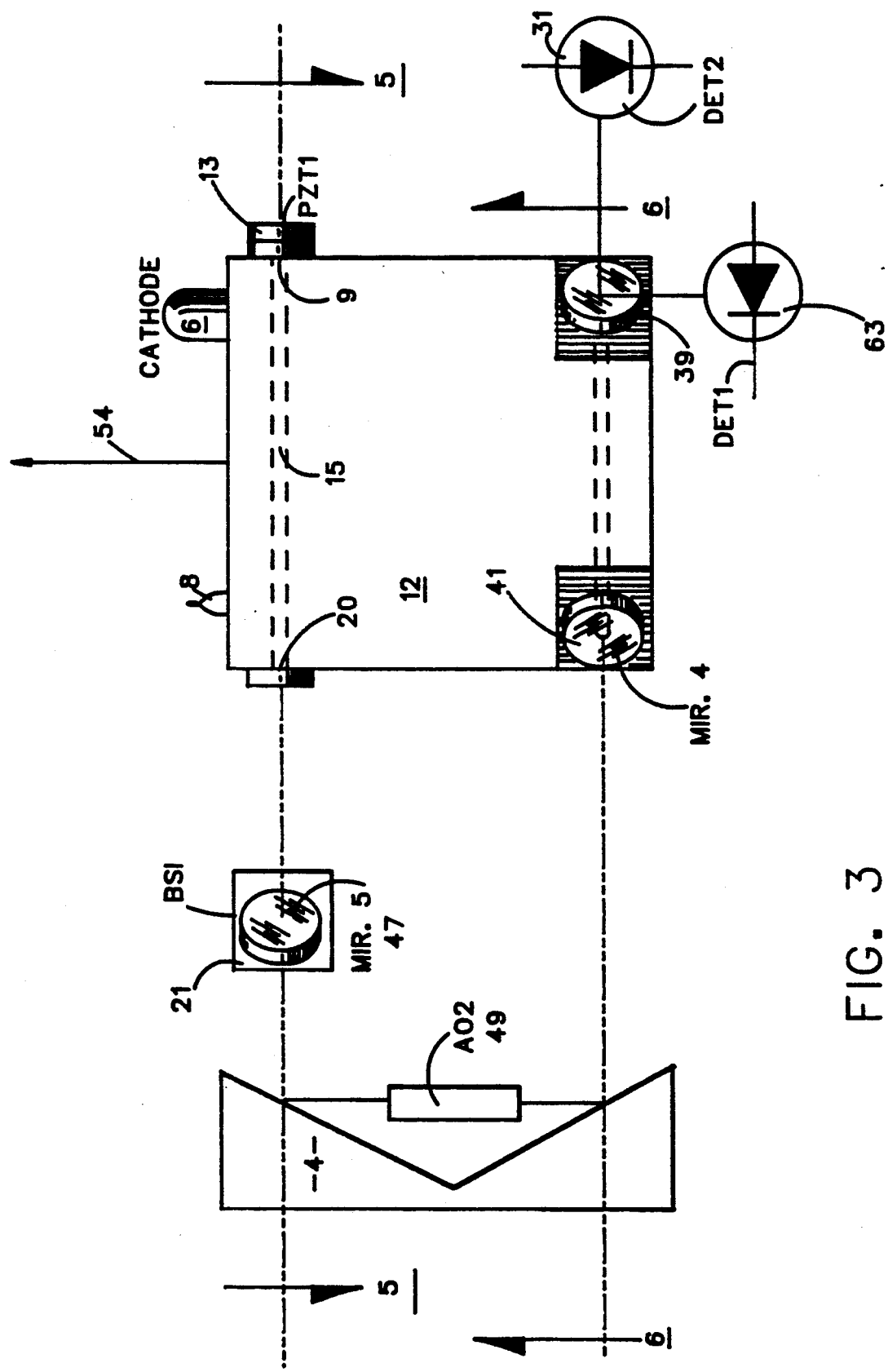
FIG. 3 is a front view of the passive ring resonator gyroscope body.
Figure 4:
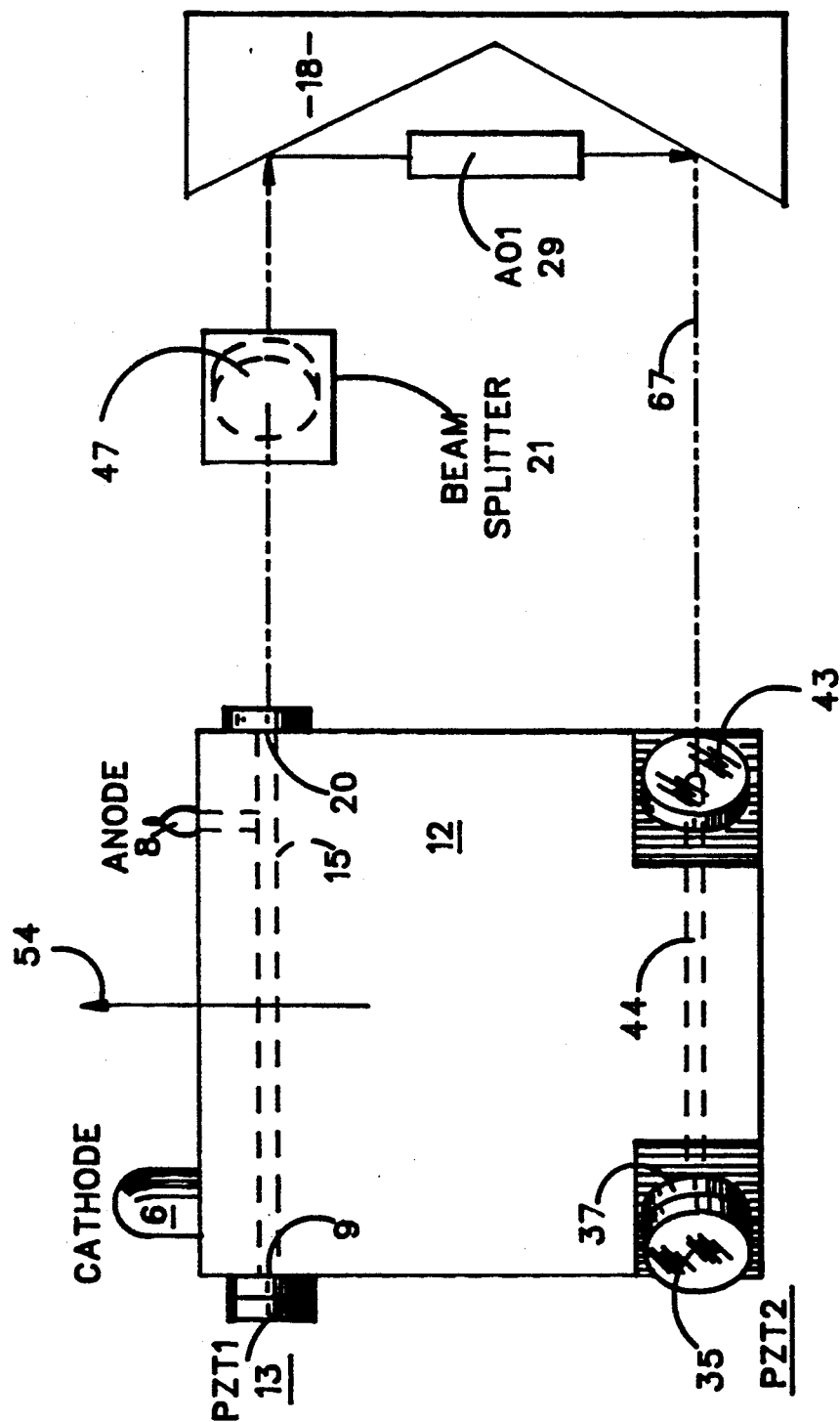
FIG. 4 is a rear view of the passive ring resonator gyroscope body.

The passive resonator cavity 16 has a closed optical path with first, second, third, and fourth segments, 44, 46, 48, 50 tuned in combination to resonate at a frequency near peak output resonance of the first resonator cavity. The sensitive axis of the PRLG is characterized by Vector 54, as shown in FIG. 3 and FIG. 4, is essentially normal to the plane of the closed second optical path established by the plane of segments 44, 46, 48, 50. Four mirrors MIR1 43, MIR2 37, MIR3 39 and MIR4 41 are used at the corners of the optical path to join the segments and close the path optically.

FIGS. 1, 2, 3, 4, and 5 show that beamsteering optics, such as first prism 18 and second prism 4 are used to couple the first and second single frequency rays 22 and 14 through AO1 (acousto-optic modulator) 29 and AO2, 49.

Elements within phantom block 60 as shown in FIGS. 7, 8, 10 and 14 represent a first voltage controlled oscillator means responsive to the first single frequency ray 22, to a first control signal via signal line 81 and to a fixed frequency first reference signal Fm1. The first voltage controlled oscillator means frequency shifts and frequency modulates the first single frequency ray 22 center frequency by a first variable offset frequency (F1+Fm1) in response to the first control signal to form a propagating light source at the output aperture 24 of AO1 29 to supply the propagating light ray 67 (FCW).

The first voltage controlled oscillator means 60 provides a first variable offset frequency signal (F1+Fm1) to the first acousto-optic modulator (AO1) 29. AO1 responds to the first ray 22 and to the first variable offset frequency signal by upshifting the frequency of the first single frequency ray 22 by a frequency equal to the frequency of the first variable offset signal (F1+Fm1) to provide the propagating light source (FCW) from aperture 24 as ray 67. MIR1 43 couples the propagating light ray (FCW) 67 into the passive resonator cavity to form the propagating light beam (FCW).

The AO1 device is structured to up or down shift the frequency of the first ray 22 by a first offset frequency F1 that is higher or lower than the center frequency F0 of the first single frequency ray 22. The voltage controlled oscillator means 60 is typically a crystal referenced voltage control oscillator typically centered about 40 MHz. The first control signal input to the voltage controlled oscillator means 60 is coupled from AMP1 19 to VCO1 45. The first control signal is typically an analog signal having a range of $0+/-5$ V. Signals in this range can pull the output frequency of the VCO $+/-40$ kHz.

Referring to FIGS. 7, 8, 10, and 14, within phantom block 75 represent a second voltage controlled oscillator means that responds to the second single frequency ray 14, to the second control signal via signal line 55 and to a fixed frequency second reference signal (Fm2) for frequency shifting and frequency modulating the second single frequency ray 14 center frequency by a second variable offset frequency (F2+Fm2) in response to the second control signal to form a counterpropagating light source at the output aperture 73 of AO2 49 to supply a counterpropagating light ray 69 (FCCW).

The second acousto-optic modular (AO2) 49 responds to the second ray 14 and to the second variable offset frequency signal by upshifting the frequency of the second ray 14 by a frequency equal to the frequency of the second variable offset frequency signal (F2+Fm2) to provide the propagating light source (FCCW) from aperture 73 as ray 69. MIR4 41 couples the counterpropagating light ray (FCCW) 69 into the passive resonator cavity to form the counterpropagating light beam.

The AO2 device is also structured to up or down shift the frequency of the second ray 14 to a second offset frequency F2 higher or lower than the center frequency F0 of the second single frequency ray 14.

Second voltage controlled oscillator means 75 provides a second variable offset frequency signal (F2+Fm2) to the second acousto-optic modulator AO2, 49. VCO2 is typically a crystal referenced voltage control oscillator typically centered about 40 MHz. The second control signal input to VCO2 is coupled from AMP2 53 to VCO2 51. The second control signal is typically an analog signal having a range of $0+/-5V$. Signals in this range can pull the output frequency of the VC0 $+/-40$ kHz.

The respective DC AMPLIFIERS such as AMP1 19 and AMP2 53 are driven by the outputs of respective integrators to apply first and second control signals to the respective voltage controlled oscillator means 60, 75. The respective VCOs shift the input CW and CCW beams in a direction to increase the response of the signal from the passive resonator cavity.

As the signal from AMP1 19 and AMP2 53 reaches a value sufficient to peak the tuning of the resonator, the signal out of the mixer goes to zero and the output of the integrator stops changing. A frequency dither from the first fixed frequency reference signal generator OSC1 33, Fm1 and the second OSC2 66, Fm2, is added to each respective control signal after amplification by AMP1 19 and AMP2 53 via the respective phase locked loop circuits within the respective voltage controlled oscillator circuits 60 and 75.

Referring again to FIG. 1, the second ray 14 is reflected by MIR5, 47 and beamsteering optics 11 to AO2, 49. The AO2 device 49 upshifts the frequency of ray 14 by F2+Fm2 Hertz to form the counterpropagating beam FCCW that enters cavity 16 via MIR4, 41. Aperture 73 of AO2 serves as a counterpropagating light ray source for counterpropagating light beam 69 (FCCW). The counterpropagating light ray 69 forms a counterclockwise beam (FCCW) as it passes through MIR4, a partially transmissive mirror 41.

The first partially transmissive and receiving port 43 is characterized to receive and pass the first light ray 67 into the passive resonator cavity 16 to form the propagating light beam (FCW).

The second partially transmissive and receiving optical port 41 is characterized to receive and pass the frequency offset beam 69 into the second resonator 16 cavity to form a counterpropagating light beam (FCCW).

Detector DET1 63 represent a first detector means optically coupled to sample the (clockwise) propagating light beam (FCW). DET1 63 detects a first frequency error signal via MIR3 39 at the first reference signal frequency (Fm1) and provides a first offset frequency error signal via signal line 34.

DET2 31 represents a second detector means that is optically coupled to sample the counterpropagating light beam (FCCW). DET2 31 detects a second offset frequency error signal via MIR3 39 at the second reference signal frequency (Fm2) and provides a second offset frequency error signal via signal line 64.

Figure 8:
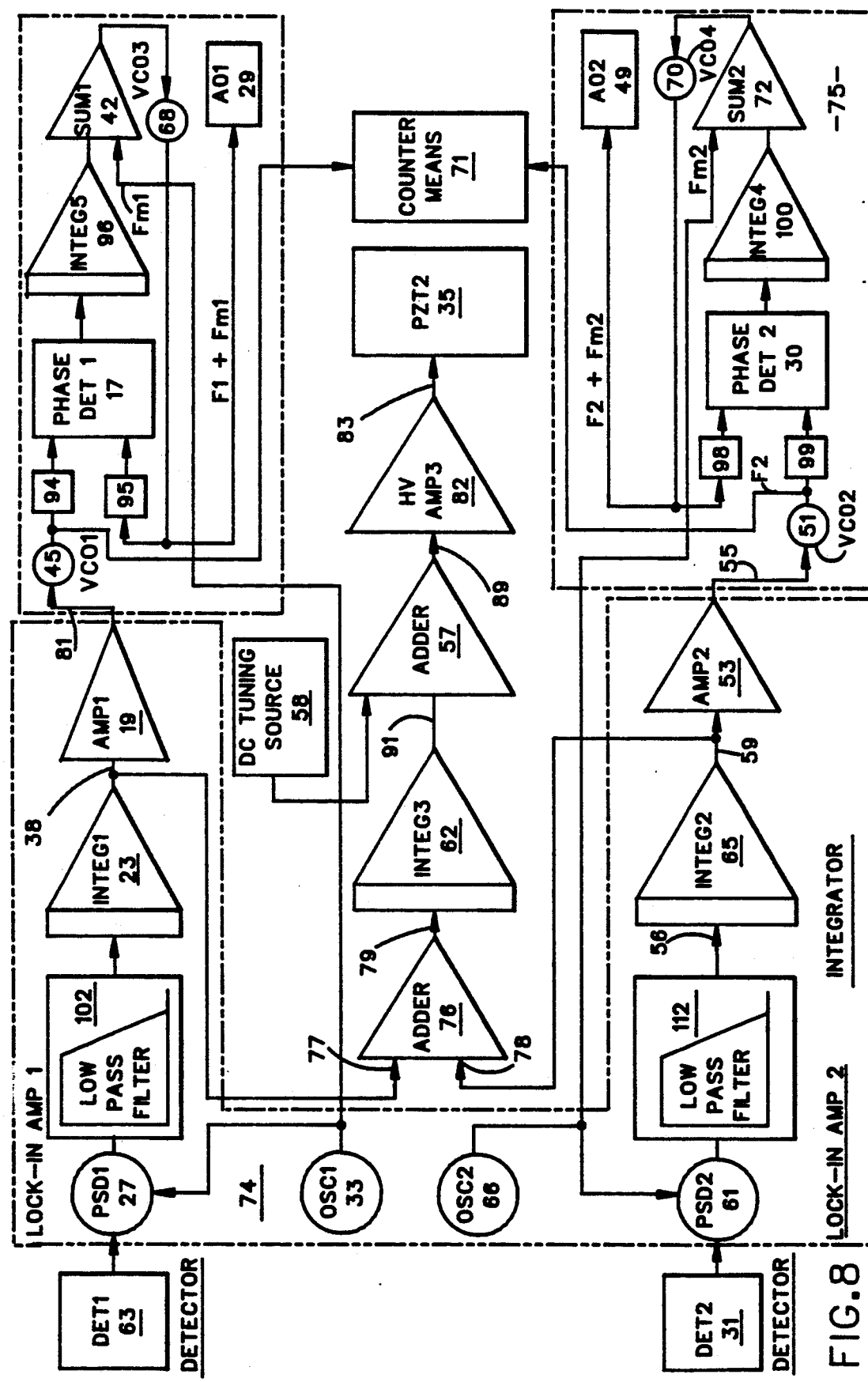
FIG. 8 is a block diagram of the passive cavity servo electronics.

FIG. 8 is an expanded schematic view of electronic elements shown in FIG. 7. FIGS. 9 and 10 are expanded views of FIG. 8.

Elements within phantom box 74 in FIG. 8 represents a CAVITY SERVO means that responds to the first and second reference signals (Fm1, Fm2) and to the first and second offset frequency error signals from the detector means DET1, DET2 63, 31 to provide a first control signal via signal line 81 to the first voltage controlled oscillator means 60 to frequency shift the first frequency modulated ray center frequency by a first variable offset frequency F1+Fm1 to maintain the propagating light beam (FCW) in the passive resonator at peak resonance. The CAVITY SERVO means 74 also provides a second control signal via signal line 55 to the second voltage controlled oscillator means 75 to frequency shift the second frequency modulated ray by a second variable offset frequency F2+Fm2 to control and maintain the counterpropagating light beam (FCCW) in the passive cavity 16 at peak resonance.

FIGS. 10 is an expanded view of some of the elements within the embodiment of FIG. 7. Phantom block 85 represents a single frequency light locking means. ADDER 76 is a FIRST ADDER means responsive to the first and second control signals via inputs 77 and 78 respectively for algebraically adding the first and second control signals to provide a passive cavity difference servo signal at ADDER output 79. INTEG3 62 represents an electronic INTEGRATOR means responsive to the passive cavity difference servo signal from ADDER output 79 to provide an integrated passive cavity difference servo signal at integrator output 91.

The integrator 62 output terminal is coupled via SECOND ADDER 57 to provide the passive cavity servo signal at the output of phantom block 85 representing the single frequency light locking means.

By integrating the passive cavity difference servo signal and feeding the passive cavity servo signal to the cavity PZT2 35 along with a bias voltage from DC TUNING SOURCE 58 via SECOND ADDER 57, the cavity center frequency is servo driven to a frequency substantially midrange between the propagating (FCW) and the counterpropagating beams (FCCW).

The DC bias voltage signal from the DC TUNING SOURCE 58 is coupled to the input 89 of HV AMP3 82 via SECOND ADDER 57 which, together with PZT2 35 as shown within phantom block 87, represents a PASSIVE CAVITY PATH LENGTH ADJUSTING MEANS.

DC TUNING SOURCE 58 provides a means for tuning the cavity to adjust the cavity to be substantially resonant at or near the peak intensity of the single frequency light source F0 plus the offset frequency F1 or F2 in the absence of a body rate input.

The PRLG shown has a first and second fixed frequency reference signals generators 33, 66. These generators are typically sinusoidal oscillators. They provide two reference signals at a fixed reference frequency (Fm1, Fm2) for the clockwise and counterclockwise servo loops, respectively. Referring to FIG. 7, oscillator, OSC1 33 and OSC2 66 provide respective first and second reference signals, i.e. sinusoidal signals at dither frequencies Fm1 and Fm2 (each being typically >10 kHz).

The first and second reference signals are separated in frequency by several kilohertz. The difference frequency between the two is selected to permit each lock-in servo to conveniently discriminate, select and track the first and second offset frequency.

Referring to FIG. 7, the FCW beam is transmitted through the cavity 16 at MIR3 39 and is focused on output detector 63 at DET1 receiving aperture 40.

Referring to FIG. 9, DET1 63 samples the FCW beam and provides a first offset frequency error signal on signal line 34 to the input of the first phase sensitive detector, PSD1 27. The first reference signal, Fm1 is supplied to PSD1. PSD1 and Low Pass Filter 102 form LOCK-IN AMP 1 25 and provide a positive or negative polarity first filtered and demodulated offset frequency error signal on signal line 28 to INTEG1 23 for integration. INTEG1 provides a first phase control signal on signal line 38 to the inputs of AMP1 19 on FIG. 10 and via signal line 26 to the single frequency light locking means first input 77.

AMP1 scales and conditions the first phase control signal and provides a first control signal to first voltage control oscillator means 60. A frequency dither at frequency Fm1 is added to the first offset frequency, F1, to form the first variable offset frequency (F1+Fm1). The first control signal's amplitude and polarity are controlled by INTEG1 23 and AMP1 19 to shift the frequency of the first offset frequency F1 in a direction to drive the filtered and demodulated offset frequency error signal on signal line 28 to zero volts.

Referring to FIG. 9, the second detector DET2 31 samples the FCCW beam and provides a second offset frequency error signal on signal line 64 to the input of the second phase sensitive detector, PSD2 61. The second reference signal Fm2 is also supplied to PSD2. The PSD2 and Low Pass Filter 112 form LOCK-IN AMP 2, 36 which provides a positive or negative polarity second filtered and demodulated offset frequency error signal on signal line 56 to INTEG2 65 for integration. INTEG2 65 provides a second phase control signal on signal line 59 to the inputs of AMP2 53 on FIG. 10 and via signal input 78 to ADDER 76. AMP2 53 conditions the second phase control signal and provides a second control signal to second voltage control oscillator means in phantom block 75. A frequency dither at the second reference frequency, Fm2 is added to the second offset frequency to form the second variable offset frequency signal (F2+Fm2). The second control signal's amplitude and polarity are controlled by INTEG2 65 and AMP2 53 to shift the frequency of the second offset frequency F2 in a direction to drive the second filtered and demodulated offset frequency error signal on signal line 56 to zero volts.

Elements such as LOCK-IN AMP 1, INTEG1 AMP1, SUM1 and LOCK-IN AMP 2, INTEG2, AMP2, SUM2, represent, in combination, two identical cavity servos. Each of these servos means are a means responsive to reference signals Fm1 and Fm2 and to the first and second offset frequency error signals from the detectors for providing a first control signal to the first voltage controlled oscillator VC01 60 for frequency shifting the first single frequency ray by a first variable offset frequency F1+Fm1 to maintain the propagating light beam (FCW) in the second resonator at peak resonance by driving the phrase difference between the detected first offset frequency error signal and the first reference signal Fm1 to a minimum value. A second control signal is provided to the second voltage, controlled oscillator means for frequency shifting the second single frequency ray by a second offset frequency (F2) to control and maintain the counterpropagating light beam (FCCW) at peak resonance by driving the difference between the detected second phase error signal and the fixed second frequency reference signal Fm2 to a minimum value.

Referring to FIG. 10, the combination of ADDER 76, in cooperation with INTEG3 62 and SECOND ADDER 57 represents a means responsive to the first and second control signals in summing input terminals 77 and 78 for providing a passive cavity servo signal to the passive cavity path length adjusting means such as PZT2 35, to adjust the passive cavity path length to keep the passive cavity resonant at a frequency substantially midrange between the propagating and the counterpropagating beams.

This method of path length control extends the oscillation range of both VC0s and keeps the CW and CCW cavity resonance centered about the frequency that the cavity is resonant at when the cavity is not rotating.

Phantom block 87 represents a PASSIVE CAVITY PATH LENGTH ADJUSTING MEANS having HV AMP3 82 and PZT2 35. The DC tuning input from DC TUNING SOURCE 58 is used to provide an initial coarse adjustment by manually tuning the voltage to center tune the cavity to the center frequency of the first single frequency F0 of the linear laser near peak intensity when the inertial rates into the gyro are zero. The high voltage amp HV AMP3 82 amplifies the passive cavity servo signal and applies it to the passive cavity's PZT2 35.

The frequency dither is optically imposed directly on the CW and CCW beams. By avoiding the conventional approach of mechanically dithering the cavity path length, the system enjoys increased servo loop bandwidth since the system is not limited by the response of a PZT used in connection with path length dither.

Referring to FIGS. 7, 8, 10 and 14, an additional VC0 is needed along with a phase lock loop device in each of the voltage controlled oscillator means within phantom blocks 60 and 75 to provide a first offset frequency F1 and a second offset frequency F2 to the counter means 71, a first variable offset frequency signal (F1+Fm1) to A01 to form the propagating ray (FCW) to the passive cavity and a second variable offset frequency signal (F2+Fm2) to A02 to form the counterpropagating ray (FCCW) to the passive cavity. In each of the respective voltage control oscillator means blocks 60, 75 one VC0 is driven by the control signal from the respective servo loop, the output of this VC0 being fed to the counter means 71. The second VC0 is phase locked to the first VC0 and also has the respective reference frequency modulation Fm added to the output frequency of the second VC0. The output of the phase locked VC0 drives the respective A0 to shift the frequency of the light beam by the servo controlled oscillator offset frequency such as F1 or F2 with the respective reference frequency modulation added.

Phase locked loop 1 17 receives inputs from the output of VC03 and the output of VC01 and provides an output signal to the second input of SUM1 42.

ALTERNATIVE EMBODIMENT

As in the system of FIG. 7, the system of FIG. 14 has two identical servo loops controlling the CW and CCW beams and resonances. In this alternative embodiment, a single frequency light locking means receives the first control signal and the second control signal via signal lines 26, 59 from integrators INTEG1 23 and INTEG2 65 to ADDER 76 to be summed and then integrated by INTEG3 62 to provide a laser cavity servo signal to PZT1 13.

ADDER 76 is a FIRST ADDER means responsive to the first and second control signals via inputs 77 and 78 respectively for algebraically adding the first and second control signals to provide a passive cavity difference servo signal at ADDER output 79. INTEG3 62 represents an electronic INTEGRATOR means responsive to the passive cavity difference servo signal from ADDER output 79 to provide an integrated laser cavity difference servo signal at integrator output 91.

The embodiment of FIG. 14 has a number of blocks that are identical in function to those shown in FIGS. 7, 8, 9, 10. The two alternative systems differ in the following way. The system of FIG. 7 drives the passive cavity PZT2 with a passive cavity servo signal to constantly tune the passive cavity to be centered on the resonant frequency of the laser. The system of FIG. 14 develops the same control signal in the same way but applies the cavity servo signal to the laser PZT1 to tune the laser to the center frequency of the passive cavity 16.

The passive cavity difference servo signal is integrated and fed to the laser PZT1 as a laser cavity servo signal via AMP 4. The linear laser center frequency is servo driven to a frequency substantially midrange between the propagating (FCW) and the counterpropagating beams (FCCW), thereby locking the frequency of the linear laser to the center frequency of the passive cavity. The source laser's frequency output is locked to the frequency midway between the peak intensity of both FCW and FCCW beams in the passive resonator's cavity.

FIG. 14 shows the first control signal being supplied to the first voltage controlled oscillator means within phantom block 60 from AMP1 output 81. The first control signal drives VCO1 45 to provide a first offset signal having a first offset frequency F1.

The first reference signal Fm1 is fed to a first input of adder SUM1 42. VCO3 68 is driven by a second composite control signal from the output of SUM1 42 and provides the first variable offset frequency signal having a first variable offset frequency (F1+Fm1) to AO1 29. Phase detector PHASE DET1 17 receives a signal frequency input from the output of VCO1 45 that is frequency divided by a factor of 100 by divider 94. Phase detector PHASE DET1 17 also receives a signal frequency input from the output of VCO3 68 that is frequency divided by a factor of 100 by divider 95. The output of PHASE DET1 17 is integrated by INTEG5 96 and supplied as a control signal to the second input to adder SUM1 42. The first variable offset signal has a first variable offset frequency (F1+Fm1) that is supplied to AO1 29 as a control signal that is amplitude modulated with the second reference signal Fm2.

FIG. 14 shows the second control signal being supplied to the second voltage controlled oscillator means within phantom block 75 from AMP2 output 55. The second control signal drives VCO2 51 to provide a second offset frequency signal having a second offset frequency F2. The second reference signal Fm2 is fed to a first input of adder SUM2 72. VCO4 70 is driven by a first composite control signal from the output of SUM2 72 and provides the second variable offset signal having a second variable offset frequency (F2+Fm2) to AO2 49.

The second reference signal Fm2 is fed to a first input of adder SUM2 72. VCO4 70 is driven by a second composite control signal from the output of SUM2 72 and provides the second variable offset frequency signal having a second variable offset frequency (F2+Fm2) to AO2 49. Phase detector PHASE DET2 30 receives a signal frequency input from the output of VCO4 70 that is frequency divided by a factor of 100 by divider 98. Phase detector PHASE DET2 30 also receives a signal frequency input from the output of VCO2 51 that is frequency divided by a factor of 100 by divider 99. The output of PHASE DET2 30 is integrated by INTEG4 100 and supplied as a control signal to the second input to adder SUM2 72.

The system of FIG. 14 uses PZT2 35 to initially tune the frequency of the passive cavity to the center frequency of the laser 15 in the absence of a body rate input. The output of DC TUNING SOURCE 58 is coupled by a signal line to HV AMP3 82 and adjusted to trim tune the cavity path length control means PZT2 35 to initially set the center frequency of the passive cavity.

Block 71 in FIG. 14 represents a COUNTER MEANS 71 for measuring and outputting the frequency difference between the first offset frequency F1 and the second offset frequency F2. The measured frequency difference between F1 and F2 represents the difference in frequency due to an input gyro body rate about the gyro sensitive axis.

The COUNTER MEANS 71 is typically a counter such as a HP5335 by Hewlett Packard for use in a laboratory, but in alternative product designs, the counter would be fabricated from conventional high speed logic circuit elements such as MECL or ECL logic by MOTOROLA suitable for use at frequencies at and above F1, the upshift frequency of the VCO signal generator (to the AO).

FIG. 12a depicts the pass band of a typical passive cavity having a resonance peak at 1202. The approximate frequency spread between reference 1204 and 1206 represents a typical frequency range between the half-power points and is included in FIG. 12 along with the indicated laser center frequency, to provide the reader with a visual appreciation of the "Q" of the second resonator. The phrase "frequency stabilization" is understood to mean phase sensitive detection including the principle of servo locking the laser output to the intensity peak of the passive cavity.

A HeNe laser typically has an instantaneous line width of less than one Hz but the operating frequency is subject to considerable jitter.

FIG. 13a characterizes a laser source directing a beam at a representative port with a portion of the beam being reflected to a detector 1305. FIG. 13b depicts a peak response to incident light from detector 1309. FIG. 13c shows a dip in the background of the light intensity 1313 striking the detector such as 1305 as the laser source at 1301 is tuned to the resonance point of the passive cavity 1307.

The first and second detectors 63 and 31 of FIG. 7 are positioned to receive the transmitted light as detector 1309 does from laser 1301 in FIG. 13a. FIG. 13b shows a response curve having a peak at resonance 1311. This response characteristic corresponds to that for diode 1309 receiving the transmitted input beam. The response curves for detectors 63 and 31 peak at resonance because, in the embodiment depicted by FIG. 1 and FIG. 7, these diodes receive the transmitted light from mirrored surface 39. At resonance, second cavity 16 absorbs light entering through mirror surfaces 43 and 41, and hence transmits the most light through MIR3 39.

The dip represented by FIG. 13c would also typically have half-power points separated by 40 kHz. Referring to FIG. 13a, typically, a HeNe input laser would have its output at $4.74 \times 10^{14}$ Hz injected along path 1303 into the passive cavity 1307.

Figure 5:
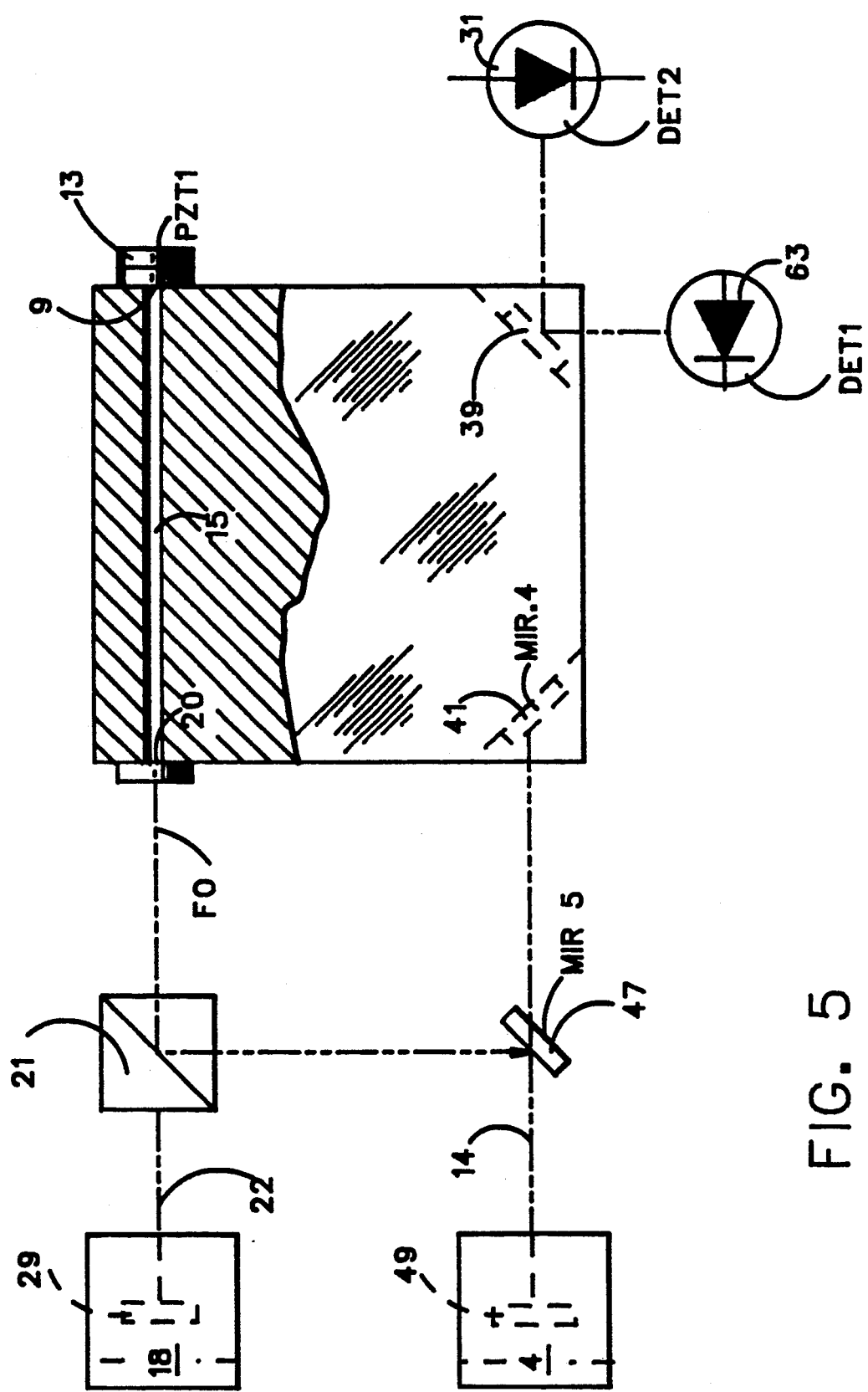
FIG. 5 is a partial sectional view of the passive ring resonator gyroscope body taken along line 5—5 of FIG. 3.

FIG. 5 shows the first resonator cavity 15 in section. The laser resonator cavity has a transmitting optical port means at first cavity port 20 for transmitting stabilized single frequency light FO and at least two internal body-mounted reflective surfaces such as partially transmissive mirror 20 and mirror surface 9 on piezoelectric transducer PZT1, 13. An appropriate gain medium, such as a mixture of Helium and Neon, is contained in the first resonator cavity 15 at a pressure in the range of 4 to 10 torr when sealed.

Figure 6:
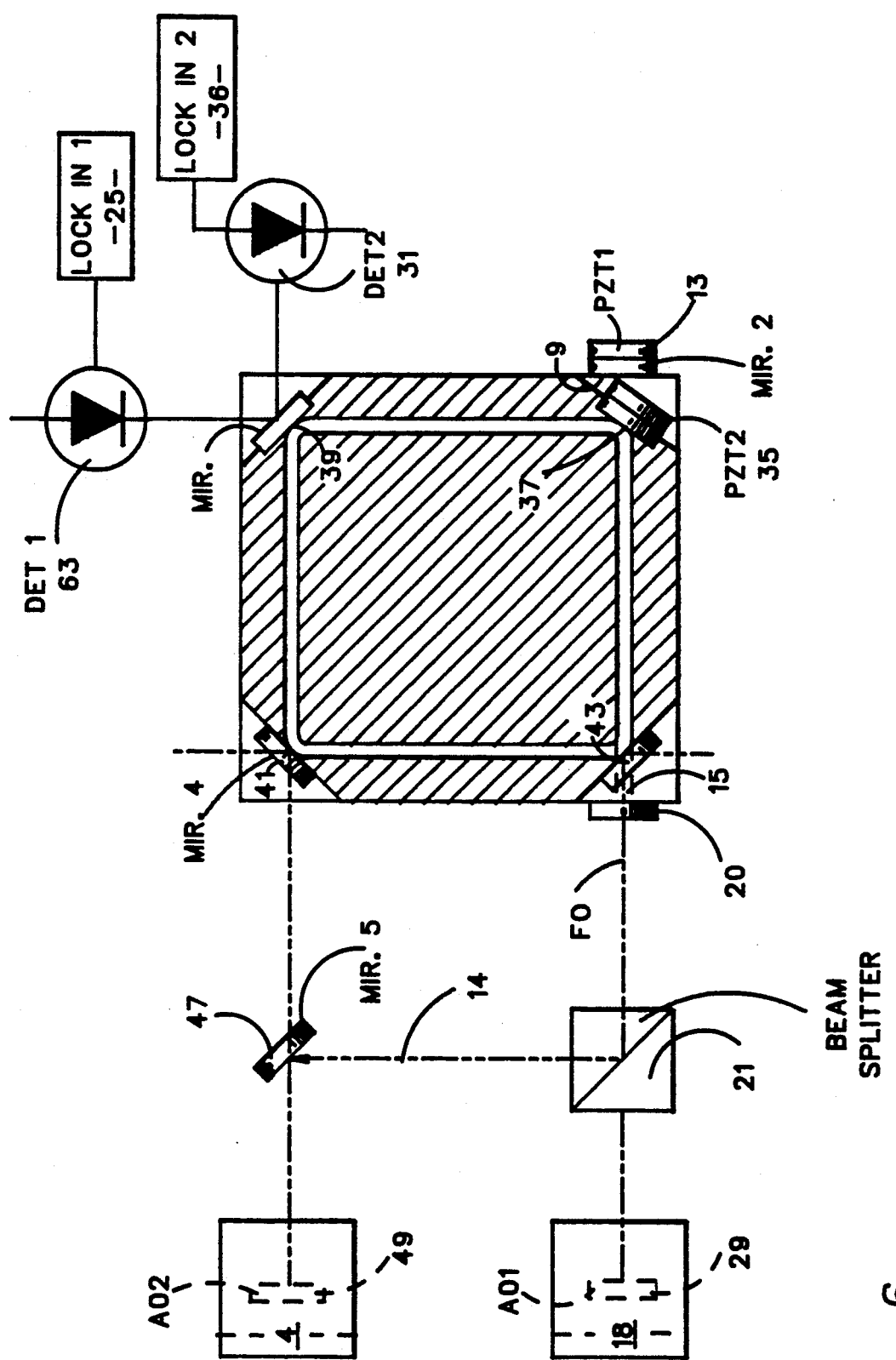
FIG. 6 is a bottom cross section taken along line 6—6 of FIG. 3 looking up.

FIG. 6 shows the second resonator cavity in section as viewed from the bottom surface to the top of the gyro. The second cavity 16 has first, second, third and fourth evacuated hollow segments, 44, 46, 48, 50. In the case of a triangular cavity (not shown) only three segments would be used. The segments of passive cavity 16 are coupled at their ends to form a closed planar evacuated path. For example, one end of segment 44 is joined with one end of segment 46 at an intersection where mirror surface 37 is attached to PZT2 35.

Referring to FIG. 7, block 80 titled EXCITATION SOURCE represents a means for exciting the gain medium within said first cavity 15 to induce lasing. This element is typically a controllable current source capable of an output voltages determined by the ionization potential of the gas mixture and an output current in the range of one to ten milliamperes.

The laser resonator cavity 16 is positioned and dimensioned in relation to the passive resonator cavity 16 to provide partial dimensional change compensation for optical path length changes in response to induced body dimension changes by temperature or external force. Bias errors relating to temperature induced body dimension changes or to changes from external forces applied to said body are cancelled providing a passive ring resonator gyroscope having enhanced stability.

Although FIGS. 1 and 7 each depict use of straight cavities for the laser means, the use of an L-shaped laser as the laser resonator cavity above, below or in the same plane as the passive resonator are anticipated to be alternative embodiments that can offer the promise for dimensional compensation. Additional alternative embodiments include an arrangement in which the first laser means has segments orientated to be transverse or orthogonal to the plane of the passive resonator cavity 16.

OPERATION

Due to the Sagnac effect, the path lengths of the clockwise (FCW) and counterclockwise (FCCW) beams in ring resonator differ as a function of body rotation rates. Consequently, the resonant frequencies for CW and CCW light in the passive cavity have a corresponding frequency difference dependence. The goal of the optics and electronics of the BALANCED DUAL SERVO FREQUENCY MODULATED VCO PASSIVE RING LASER GYROSCOPE (PRLG) is to detect the frequency difference that arises between the CW and CCW beams due to inertial rotations. The intent of the single body small source linear phase locked laser/passive cavity design is to eliminate bias errors caused by the resonant frequencies of the linear laser and passive cavity changing with respect to one another. In this integral, single block, or single piece body these bias errors will also be independent of input rotation rates. The two cavities are arranged mechanically and geometrically to insure that shifts in laser frequency arising from body dimensional changes are experienced by both the passive resonator cavity and the linear laser cavity and therefore reduce the effect of such bias errors.

To obtain such bias compensation, the Free Spectral Range of the first resonant cavity 15 is made equal to the Free Spectral Range of the second resonant cavity 16. The Free Spectral Range (F.S.R.)=c/p where c is the speed of light and p is the optical round trip pathlength of a resonator. Thus, the F.S.R. of a square passive ring resonator with sides of length L is c/4L. To meet the F.S.R. requirement, two cases arise contingent upon the linear resonator design. The first resonator forming the laser means is comprised of a mirror with no curvature, i.e. a flat mirror, and a mirror with a predetermined radius of curvature, i.e. a curved mirror, the required resonator length between mirrors is L. The F.S.R. of this flat mirror, curved mirror resonator equals c/4L. However, a resonator using two curved mirrors requires a resonator length between mirrors equal 2L. This configuration also has a F.S.R. equaling c/4L. With the criteria that:

$$(F.S.R.)_{Laser} = (F.S.R.)_{Passive\ Resonator} = c/4L.$$

it is apparent that any change in the F.S.R. of the laser resonator will equal any change in the F.S.R. of the passive ring resonator which may arise from thermal or mechanical changes.

Mirrors with piezoelectric (PZT) backings supply a path length adjusting means to the passive resonator cavity. This adjustment effects both the paths of the CW and CCW beams. Light transmitted through the passive cavity from the CW direction is detected and phase sensitive demodulated at Fm1 by employing a mixer or phase sensitive detector, such as PSD1. The phase error signal is integrated, amplified and then applied as the first control signal on signal line 81 as shown in FIG. 8 to the input of voltage controlled oscillator means 60 along with the first reference frequency Fm1 to bring the CW beam into resonance. Light transmitted through the passive cavity from the CCW direction is detected and phase sensitive demodulated at the second reference frequency by PSD2. The second phase error signal is integrated, amplified and then applied as the second control signal on signal line 55 to the input of the second voltage controlled oscillator means 75 along with the second reference frequency Fm2 to bring the CCW beam into resonance. The respective VCOs shift the respective frequencies of the injected CW and CCW beams to bring them into resonance in the passive cavity. Identical servo loops are used for both CCW and CW beams.

In the preferred embodiment of FIG. 7, a DC tuning source signal from DC TUNING SOURCE 58 is summed along with the passive cavity control signal on signal line 91 to provide for initial coarse frequency alignment. There is no frequency modulation or dither in the passive cavity control signal. The bandwidth of the servo is not limited by the response time of the PZT in the embodiments of FIGS. 7 and 14. This invention permits much higher modulation frequencies and a corresponding faster response time is possible if the frequency modulation is applied to the AO cells via the voltage controlled oscillator means 60, 75. The sum of the first and second phase error signals is used as a passive cavity path length servo control signal to compensate for and follow the thermal and mechanical drifts in the cavity and also to keep the injected beam FO at resonance midway between the CW and CCW resonances.

The DC tuning source coarsely tunes the passive cavity to coincide with the peak intensity output of the linear source laser.

The ring laser gyroscope shown in FIG. 1 has two identical servo control loops, the CW loop referenced to OSC1 33 at Fm1 and the CCW loop referenced to OSC2 66 at Fm2.

Laser 15 provides a coherent light source at frequency FO. The laser light source is split by beamsplitter 21 to source a first beam, ray 22, to AO1 (acousto-optic modulator 1) 29 and a second beam, ray 14, to MIR5 (mirror 5) and thence to AO2, 49 (acousto-optic modulator 2).

First voltage controlled oscillator means 60 along with the frequency dither from OSC1 33 typically operates at a first variable offset frequency of approximately frequency of 40 MHz and drives AO1 29 at frequency F1+Fm1. The laser light source provides a first single frequency ray with a center frequency F0 that passes through AO1 29 and is frequency shifted to contain the frequency component F0+F1+Fm1.

The light source from AO1, is directed into MIR1 43, a partially transmissive reflector. That portion of the light that enters passive cavity 16 circulates as ray 44, ray 46, ray 48 and ray 50 to form the FCW (clockwise) beam in the cavity.

Referring to FIG. 7, the input path to the first servo loop consists of the path through BS2 21, to AO1 29, to MIR1 43, around the passive cavity and out of MIR3 39 to DET1 63. DET1 63 provides an electrical signal via signal line 34 to the input of PSD1 (phase sensitive detector 1) 27. PSD1 27 also receives a signal at frequency Fm1 at its reference input. PSD1 and Low Pass Filter 102 form LOCK-IN 1 25 to provide a first offset frequency error signal at its output to INTEG1 23.

The first offset frequency error signal is produced as the instantaneous frequency of the laser is swept past the line bandwidth of the cavity. At that moment, the cavity absorbs the FCW light through MIR1 to produce a peak in the signal to the DET1 63 and subsequently to PSD1 27. PSD1 is sensitive only to the first reference frequency Fm1 signal component to DET1.

Second voltage controlled oscillator means 75 along with the frequency dither from OSC2 66 typically operates at a second variable offset frequency and drives AO2 49 at frequency F2+Fm2. The laser light source provides a second single frequency ray with a center frequency F0 that passes through AO2 49 and is frequency shifted to contain frequency component F0+F2+Fm2.

The light source from AO2 is directed to and predominately transmitted into partially transmissive reflector 41. That portion of the CCW ray that enters passive cavity 16 circulates as ray 48, ray 46, ray 44 and ray 50 to form the FCCW (counterclockwise) beam in the cavity.

Referring to FIG. 7, the input path to the second servo loop consists of the path through BS2 21, to AO2 49, to MIR4 41, around the passive cavity and out of MIR3 39 to DET2 31. DET2 31 provides a second offset frequency error signal via signal line 64 to the input of PSD2 (phase sensitive detector 2) 61 and Low Pass Filter 112 forming LOCK-IN AMP2. PSD2 61 also receives a signal at frequency Fm2 at its reference input. LOCK-IN 2 provides a second filtered and demodulated offset frequency error signal at its output to INTEG2 (integrator 2) 65.

The second offset frequency error signal is produced as the instantaneous frequency of the laser is swept past the line bandwidth of the cavity. At that moment, the cavity absorbs the FCCW light through MIR4 to produce a peak in the signal to the DET2 31 and subsequently to PSD2 61. PSD2 is sensitive only to the second reference frequency Fm2 signal component to DET2. LOCK-IN AMP2 provides a polarized error signal via signal line 56 to the input of integrator INTEG2 65.

Two identical servo loops are used to control and shift the CW and CCW beams onto each of their respective cavity resonances. The path length of the second cavity is adjusted by one PZT. PZT2 35 has a DC bias coarse control to bring the frequency of the second cavity into close coincidence with that of the first cavity. The error signals from INTEG1 and INTEG2 are summed together by adder 76 and this sum is integrated by INTEG3 and amplified by AMP3, 82 to drive PZT2, 35. This sum technique doubles the dynamic range of the VCO's taken together and keeps the CW and CCW resonances symmetric about the nonrotating resonant cavity frequency. The coarse DC control signal, which is used to bring the second cavity into resonance with the first cavity, is added through ADDER 52 to the path length servo signals from the two VCO loops and applied to AMP3 82 and then applied to PZT2 35.

PHASE SENSITIVE DETECTION STABILIZATION TECHNIQUE

Figure 11A:
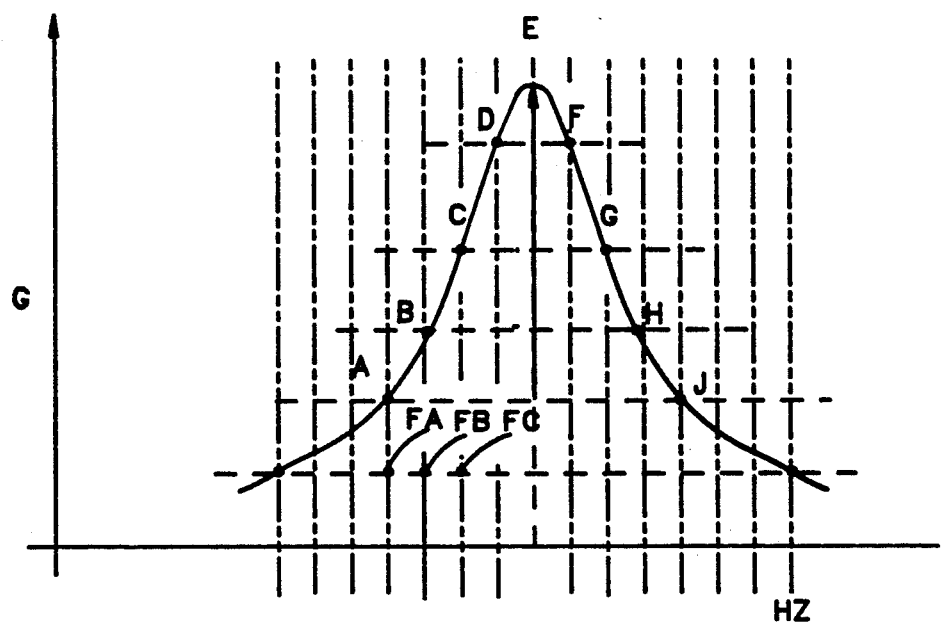
FIG. 11a is a waveform characterizing the signal response from a detector sensing light from an optical passive cavity as frequency is increased from below resonance to a frequency above resonance.

The principle of synchronous demodulation is explained by referring to FIG. 11a which shows the output response curve for a tuned system such as an optical resonator. The output response curve of FIG. 11a is meant to be similar in character to the response curve of FIG. 12a where the center frequency of an injected HeNe laser is $4.7 \times 10^{+14}$ Hz.

Figure 11B:
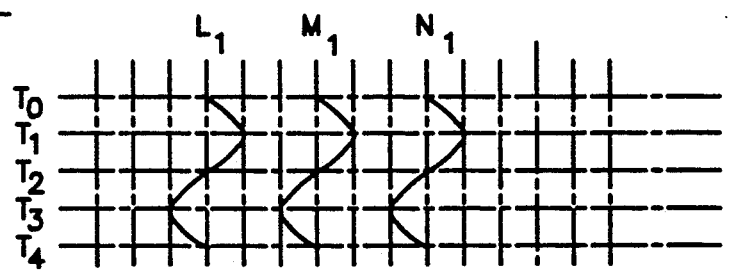
FIG. 11b shows three sinusoidal waveforms depicting identical frequency modulation ranges.
Figure 11C:
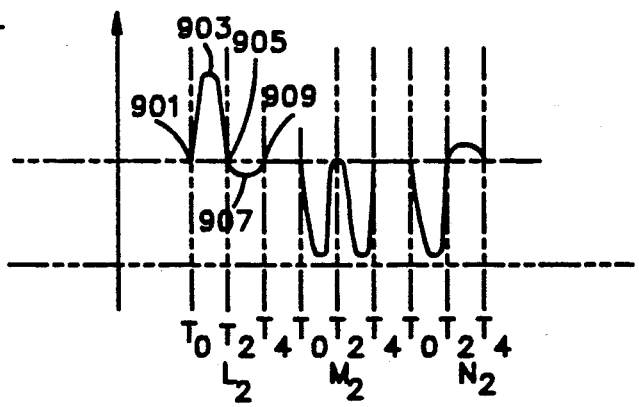
FIG. 11c shows three waveforms from detector diodes sensing light from the cavity of FIG. 11a as a frequency is modulated in ranges characterized by the waveforms of FIG. 11b.

FIG. 11b shows waveforms L1, M1 and N1 as they vary with increasing time from T0 to T4. These waveforms are meant to have amplitudes which when projected onto the horizontal axis of FIG. 11a, characterize the shift in frequency, or modulating range, of single frequency light being sourced to the cavity 16 via mirror ports 43 and 41.

At T0, waveform L1 provides light to the cavity at a frequency of FB. At frequency FB, the signal from the detector has an amplitude at 901 as shown in FIG. 11b. As time increases to T1, voltage L1 shifts or modulates the light source up in frequency to frequency FC at which point, the detector provides an output signal with amplitude peak 903 as shown in FIG. 11b. At T2, L1 returns the light source to frequency FB. At T2, the detector output returns to the amplitude 905. At time T3, modulation voltage L1 drives to FA and the detector output drops to a negative peak 907 as shown in FIG. 11b. At T4, L1 returns to FB with the detector again providing an amplitude at 909.

FIG. 11 shows the detector outputs amplitude referenced to zero volts by use of a DC blocking or decoupling circuit and synchronized with frequencies FA, FB and FC. The mixer receives a reference square wave signal synchronized to the waveforms of FIG. 9b. During the interval T0 to T2, the mixer multiplies the detector output times a factor of +1. During interval T2 to T4, the mixer multiplies the detector output by −1.

Figure 11D:
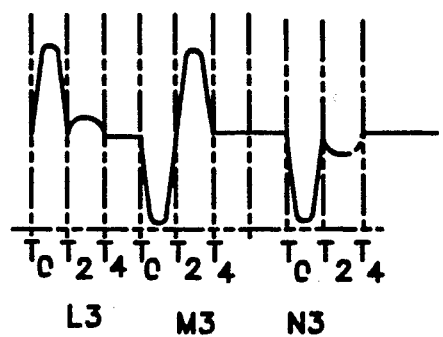
FIG. 11d shows the waveforms from a synchronous mixer receiving the signal waveforms of FIG. 11c.

FIG. 11d provides a characterization of the output of the mixer (27, 61) fed to the low-pass filter in synchronization with T0 through T4. Due to the location of the modulation range associated with waveform L1, the mixer provides an output having two positive regions as shown by waveform L3. The output of the low pass filter would be an average positive dc voltage.

A similar explanation can be made to show that the modulation range of M1 results in the detector output of M2 and the mixer output of M3, and that the modulation range of N1 results in the detector output of N2 and the mixer output of N3.

The low-pass filter of the lock-in amplifier accepts the signal of L3 to produce a net positive output, the signal of M3 to produce a zero output and the signal of N3 to produce a net negative output.

The signals of L3, M3 and N3 are integrated by the integrator (23, 65) to provide an error voltage to the respective PZT to shift the frequency of the laser.

Referring to FIGS. 7, 8, 9 and 10, the LOCK-IN AMPLIFIER 25, 36 functions to mix a dither signal, such as the first or second reference signals Fm1 or Fm2, typically near 10 kHz with a DETECTOR output signal that contains information at the respective Fm1 or Fm2 dither signal frequency. Using a synchronous demodulation or phase sensitive detection technique, control information is obtained in high noise environments. Lock-in amplifiers of this type are sensitive to the phase relationship between the input information signal and the reference or dither signal of the lock-in amplifier. An in-phase information signal will provide an output response of one polarity and an 180° out-of-phase relationship will result in an output signal of an opposite polarity. A typical LOCK-IN AMPLIFIER suitable for laboratory use is the PRINCETON APPLIED RESEARCH Model 124A manufactured at Princeton, N.J. Amplifiers of this type are typically high Q DC amplifiers that provide a gain of several thousand at the reference or dither frequency and have virtually no gain at other frequencies above or below the reference frequency. For an information signal of a fixed level at the reference frequency, the amplifier typically provides a fixed DC level response at its output.

CAVITY AND AO SERVO OPERATION

The acousto-optic device is an essential element in a filtered and demodulated first offset frequency error signal. This filtered and demodulated first offset frequency error signal is the servo error signal that is integrated and then amplified and fed into a voltage controlled oscillator means 60 or 75. The voltage controlled oscillator means provides output signals that drive the AO1 and AO2 devices to shift the respective CW or CCW beam frequencies such that the CW or CCW beam is brought into the cavity's resonance. In addition, a frequency dither at reference frequency Fm1 and Fm2 is added to the VCO3, VCO4 input such that the shifted CW or CCW beam has a frequency dither component on it to be used in their respective phase sensitive demodulation process. By applying the dither to the VCO and AO cells, a larger loop bandwidth (larger Fm $\approx$ 10–20 kHz) can be obtained than if the frequency dither was just applied to the PZT (1–5 kHz).

The CCW light is detected and phase sensitive demodulated in its corresponding servo loop. PSD2 provides a second filtered and demodulated error signal on signal line 56 to the input of INTEG2 65 where it is integrated and amplified and fed into a voltage controlled oscillator VCO2 51. The output frequency of VCO2, 51 is used to offset the frequency that AO2 shifts the CCW beam such that the frequency of the CCW beam is brought into the cavity's resonance.

The CW light is detected and phase sensitive demodulated in its corresponding servo loop. PSD1 provides a first filtered and demodulated error signal on signal line 28 to the input of INTEG1 23 where it is integrated and amplified and fed to VCO1, 45 in the voltage controlled oscillator means 60 along with the first reference frequency signal Fm1. The VCO1 output frequency of VCO1 is used to offset the frequency that AO1 shifts the CW beam such that the frequency of the CW beam is brought into the cavity's resonance.

Two servos used in the AO, VCO portions of each CW and CCW loop are identical adding symmetry to the system implementation. The input rotation rate to the Phase Locked PRLG sensitive axis is related to the VCO's frequency and is the frequency difference F1−F2 of the frequencies supplied to AO1 and AO2. This frequency difference F1−F2 is counted using counter 71 to form a digital output signal which is scaled to provide a digital representation of the rotation rate about the sensitive axis.

ACOUSTO-OPTICS

The two AO devices are each typically made up of a piezoelectric transducer attached to a crystal. The AO device is fabricated from a piezoelectric crystal material such as quartz, $TeO_2$ (Tellurium Dioxide) or $PbMoO_4$ (Lead Molybdate). In the preferred embodiment, the AO1 transducer driven at F1, establishes an acoustic wave at frequency F1 in the crystal. Associated with the acoustic wave is a varying index of refraction due to the compressions and rarefactions of atomic density in the crystal. Incoming light diffracts off this induced grating giving rise to many orders of diffracted beams. The zeroth order beam is at the frequency of the single frequency light, F0. The first order beam has the frequency (F0 +F1) where F1 is the frequency of the acoustic wave. Here the input beam is assumed to be F0.

The output from the AO device has the discrete frequencies (F0)+nF2 where n=0,1,2 ... each separated in space by an angle proportioned to n. Thus, we see that by shifting the AO F2 wave frequency by 1 Hz, we can add 1 Hz to the frequency of the first order beam exiting the AO2 device. Therefore, the AO's operate as frequency shifters in our application. (See e.g., *Optical Waves in Crystals*, A. Yariv & P. Yeh (John Wiley & Sons)

COMMON MODE

Since two acousto-optic devices are used, each beam encounters similar phase shifts. AO2, driven by the VCO2, shifts the CCW light up or down in frequency by F2; AO1 in frequency by F2, and AO1, in the CW beam path driven by VCO1, shifts the CW beam up or down in frequency by F1. By passing the CW light through an acousto-optic device, common mode bias errors are eliminated with respect to the CCW beam.

Although the invention has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A balanced dual servo passive ring resonator gyroscope having enhanced stability and sensitivity comprising:
    a first and second fixed frequency reference signal generator to provide respective first and second reference signals, each reference signal having a fixed reference frequency (Fm1, Fm2);
    a single piece body having laser and passive resonator cavities, said passive resonator cavity being a passive high Q evacuated cavity;
    a laser means having a power source, using said laser resonator cavity for providing first and second single frequency rays (F0);
    a first voltage controlled oscillator means responsive to said first single frequency ray, to a first control signal and to said first reference signal (Fm1) for frequency shifting the center frequency of said first single frequency ray by a first variable offset frequency signal (F1+Fm1) to supply a propagating light ray (FCW); for coupling said propagating light ray into said passive resonator cavity to form a propagating light beam; and for outputting a first offset signal (F1);

a second voltage controlled oscillator means responsive to said second single frequency ray, to a second control signal, and to said second reference signal (Fm2) for frequency shifting the center frequency of said second single frequency ray by a second variable offset frequency signal (F2+Fm2) to supply a counterpropagating light ray (FCCW) and for coupling said counterpropagating light ray into said passive resonator cavity to form a counterpropagating light beam; and for outputting a second offset signal (F2);

a detector means optically coupled to sample said propagating light beam (FCW) for detecting a first offset frequency error signal at said first reference signal frequency (Fm1) and to provide a first offset frequency error signal, said detector means also being optically coupled to sample said counterpropagating light beam (FCCW) for detecting a second offset frequency error signal at said second reference signal frequency (Fm2) to provide a second offset frequency error signal;

cavity servo means responsive to said first and second reference signals Fm1, Fm2 and to said respective first and second offset frequency error signals from said detector means for providing said first control signal to said first voltage controlled oscillator means for shifting the frequency of said propagating light ray by a first variable offset frequency (F1+Fm1) to control and maintain said propagating light beam (FCW) in said passive resonator at peak resonance and for providing said second control signal to said second voltage controlled oscillator means for shifting the frequency of said counterpropagating light ray by a second variable offset frequency (F2+Fm1) to control and maintain said counterpropagating light beam (FCCW) in said passive cavity at peak resonance;

single frequency light locking means responsive to said first and second control signals for balancing said first and second control signals;

output counter means for measuring and outputting the frequency difference between said first offset frequency (F1) and said second offset frequency (F2), the measured frequency difference representing the difference in frequency due to an input gyro body rate.

2. The passive ring resonator gyroscope of claim 1 wherein said single frequency light locking means further comprises:

a FIRST ADDER means responsive to said first and second control signals for algebraically adding said first and second control signals to provide a passive cavity difference servo signal;

an INTEGRATOR means responsive to said passive cavity difference servo signal for providing an integrated passive cavity difference servo signal; and a passive cavity path length adjusting means responsive to said integrated passive difference cavity servo signal for adjusting said passive cavity to be substantially resonant at the center frequency (F0) of said first and second single frequency rays.

3. The passive ring resonator gyroscope of claim 1 wherein said single frequency light locking means further comprises:

a FIRST ADDER means responsive to said first and second control signals for algebraically adding said first and second control signals to provide a passive cavity difference servo signal;

an INTEGRATOR means responsive to said passive cavity difference servo signal for providing an integrated passive cavity difference servo signal; and a passive cavity path length adjusting means responsive to said integrated passive cavity difference servo signal for adjusting said passive cavity to be resonant at a frequency substantially central to said first and second offset frequencies.

4. The passive ring resonator gyroscope of claim 1 wherein said laser means further comprises:

a laser piezoelectric transducer (PZT1) having a mirror surface positioned within said laser cavity and being responsive to an integrated laser cavity difference servo signal for adjusting the pathlength of reflected light within said laser resonator cavity; and wherein said single frequency light locking means is further characterized to provide said integrated laser cavity difference servo signal to said laser piezoelectric transducer to adjust the frequency of said first and second single frequency rays (F0) leaving said laser means to balance the first and second control signals.

5. The passive ring resonator gyroscope of claim 4 wherein said single frequency light locking means comprises:

a FIRST ADDER means responsive to said first and second control signals for algebraically adding said first and second control signals to provide a laser cavity difference servo signal;

an INTEGRATOR means responsive to said laser cavity difference servo signal for providing said integrated laser cavity difference servo signal.

6. The passive ring resonator gyroscope of claim 1 wherein said passive cavity further comprises:

a passive cavity piezoelectric transducer (PZT2) having a mirror surface positioned within said passive cavity to adjust the pathlength of reflected light within said passive cavity, said passive cavity piezoelectric transducer (PZT2) being responsive to a passive cavity servo signal; and wherein said single frequency light locking means is further characterized to be responsive to said first and second control signals for providing said passive cavity servo signal to adjust the resonant frequency of said passive cavity to be to balance the first and second control signals.

7. The passive ring resonator gyroscope of claim 6 wherein said single frequency light locking means comprises:

a FIRST ADDER means responsive to said first and second control signals for algebraically adding said first and second control signals to provide a passive cavity difference servo signal;

an INTEGRATOR means responsive to said passive cavity difference servo signal for providing an integrated passive cavity difference servo signal; and a passive cavity path length adjusting means responsive to said integrated passive cavity difference servo signal for adjusting said passive cavity to be substantially resonant at the frequency of said first and second single frequency rays.

8. The passive ring resonator gyroscope of claim 1 wherein said first voltage controlled oscillator means comprises:
- a first voltage controlled oscillator responsive to said first control signal for providing a first offset frequency signal (F1) having a first offset frequency (F1) to said counter means;
- an integrator responsive to a first phase error signal for providing a first integrated phase error signal;
- a summer having a first input responsive to said first integrated phase error signal and a second input responsive to said first reference signal for providing a first composite variable offset frequency control signal;
- a second voltage controlled oscillator responsive to said first composite variable offset frequency control signal for providing a first variable offset frequency signal (F1+Fm1);
- a phase detector responsive to said first offset frequency signal (F1) and to said first variable offset frequency signal (F1+Fm1) for providing said first phase error signal;
- a modulator means responsive to said first variable offset frequency signal (F1+Fm1) for modulating the frequency of said first single frequency ray to provide said propagating light ray (FCW).

9. The passive ring resonator gyroscope of claim 8 wherein said modulator means further comprises:
- a first acousto-optic coupler (AO1) responsive to said first single frequency ray and to said first variable offset frequency signal for upshifting the frequency of said first single frequency ray (FO) by a first variable offset frequency equal to the frequency of said first offset frequency signal (F1) plus the frequency of said first reference signal (Fm1), and for providing said propagating light ray (FCW) to said passive resonator cavity.

10. The passive ring resonator of claim 1 wherein said detector means for detecting a first offset frequency error signal and for detecting a second offset frequency error signal further comprises:
- first and second detector diodes and respective first and second detector amplifiers, each detector amplifier being electrically coupled to a respective detector diode and both amplifier and diode being biased to provide respective first and second offset frequency error signals;
- said first detector diode being coupled to be responsive to a sample of said propagating light beam and to provide a detected first offset frequency error signal; and
- said second detector diode being coupled to be responsive to a sample of said counterpropagating light beam and to provide a detected second offset frequency error signal, each respective detected offset frequency error signal being amplified by a respective detector amplifier to provide a respective offset frequency error signal.

11. The passive ring resonator of claim 1 wherein said cavity servo means further comprises:
- first and second lock-in amplifiers, each lock-in amplifier being responsive to a respective reference signal, (Fm1, Fm2) and to a respective first and second offset frequency error signal, for demodulating, filtering and integrating each respective first and second offset frequency error signal to provide respective first and second filtered and demodulated offset frequency error signals; and
- a first and second servo integrator;
    - said first integrator having an input coupled to receive said first filtered and demodulated frequency error signal and an output to provide said first control signal; and
    - said second integrator having an input coupled to receive said second filtered and demodulated offset frequency error signal and an output to provide said second control signal.

12. A balanced dual servo passive ring resonator gyroscope having enhanced stability and sensitivity comprising:
- a first and second reference signal generator to provide respective first and second reference signals, each reference signal having a fixed reference frequency (Fm1, Fm2);
- a single piece body having laser resonator cavity, and a passive resonator cavity having a closed optical path;
- a laser means having a power source and using said laser resonator cavity containing a lasing medium, said laser means having a laser cavity servo path length adjusting means (PZT1) responsive to an integrated linear laser difference servo signal for providing a single frequency light ray (FO) from a transmitting aperture;
- said passive resonator cavity being a passive high Q evacuated cavity;
- the sensitive axis of said passive ring resonator gyroscope being essentially normal to the plane of said passive resonator cavity closed optical path;
- means responsive to said single frequency light ray for splitting said single frequency light ray (FO) into respective first and second single frequency rays;
- a first voltage controlled oscillator means responsive to said first single frequency ray, to a first control signal, and to said first reference signal (Fm1) for providing a first offset frequency signal having a first offset frequency (F1); and for frequency shifting the center frequency of said first single frequency ray by a first variable offset frequency (F1+Fm1) to supply a propagating light ray (FCW);
- coupling means for coupling said propagating light ray into said passive resonator cavity to form a propagating light beam (FCW);
- a second voltage controlled oscillator means responsive to said second single frequency ray, to a second control signal, and to said second reference signal (Fm2) for providing a second offset frequency signal having a second offset frequency (F2); and for frequency shifting the center frequency of said second single frequency ray by a second variable offset frequency (F2+Fm2) and frequency modulating said second single frequency ray center frequency by said second reference frequency (Fm2) to supply a counterpropagating light source to supply a counterpropagating light ray (FCCW);
- coupling means for coupling said counterpropagating light ray (FCCW) into said passive resonator cavity to form a counterpropagating light beam (FCCW);
- a detector means optically coupled to sample said propagating light beam (FCW) to detecting a first offset frequency error signal at said first reference signal frequency (Fm1) and to provide a first offset frequency error signal, said detector means also being optically coupled to sample said counterpropagating light beam (FCCW) for detecting a second offset frequency error signal at said second reference signal frequency (Fm2) to provide a second offset frequency error signal;

a cavity servo means responsive to said first and second reference signals Fm1, Fm2 and to said respective first and second offset frequency error signals from said detector means for providing said first control signal to said first voltage controlled oscillator means for frequency shifting the center frequency of said propagating light ray by a first variable offset frequency (F1+Fm1) for controlling and maintaining said propagating light beam (FCW) in said passive resonator at peak resonance; and for providing said second control signal to said second voltage controlled oscillator means for frequency shifting the center frequency of said counterpropagating light ray by a second variable offset frequency (F2+Fm2) for controlling and maintaining said counterpropagating light beam (FCCW) in said passive resonator cavity at peak resonance;

a FIRST ADDER means responsive to said first and second control signals for algebraically adding said first and second control signals to provide a linear laser path length difference servo signal;

an INTEGRATOR means responsive to said linear laser difference servo signal for providing said integrated linear laser difference servo signal;

said passive cavity having a passive cavity path length adjusting means responsive to a DC bias for adjusting said passive cavity to be substantially resonant at the frequency of said single frequency light source in the absence of gyro body rate; said linear laser difference servo signal tuning the frequency of the single frequency light ray to balance the frequency difference between the first and second offset frequency signals with respect to the resonant frequency of the passive resonator cavity; and an output counter means responsive to said first and second offset frequency signals (F1), (F2) for measuring and outputting the frequency difference between said first offset frequency (F1) and said second offset frequency (F2), the measured frequency difference representing the difference in frequency due to an input gyro body rate about said gyro sensitive axis.

13. The passive ring resonator gyroscope of claim 12 wherein said first piezoelectric transducer (PZT1) has a mirror surface positioned within said laser resonator cavity to adjust the pathlength of reflected light within said laser resonator cavity, said PZT1 being responsive to said integrated linear laser difference servo signal to adjust the output frequency of the single frequency light ray (F0) leaving said laser resonator cavity to be substantially resonant at a frequency centered between the resonant frequency of the propagating beam FCW and the resonant frequency of the counterpropagating beam FCCW.

14. The passive ring resonator of claim 13 wherein said first voltage controlled oscillator means further comprises:
an integrator responsive to a first phase error signal for providing a first integrated phase error signal;

a first summing amplifier (SUM1) for adding said first integrated phase error signal and said first reference signal (Fm1) to provide a first composite variable offset frequency control signal;

a first voltage controlled oscillator (VC01) responsive to said first control signal for providing a first offset frequency signal (F1);

a second voltage controlled oscillator responsive to said first composite variable offset frequency control signal for providing a first variable offset frequency signal;

a phase detector responsive to said first offset frequency signal (F1) and to said first variable offset frequency signal for providing said first phase error signal; and a first acousto-optic coupler (A01) responsive to said first single frequency ray and to said first variable offset frequency signal for upshifting the frequency of said first single frequency ray (F0) by a frequency equal to the frequency of said first voltage controlled oscillator output signal (F1), and for providing said propagating light ray (FCW) to said passive resonator cavity.

15. The passive ring resonator of claim 14 wherein said second voltage controlled oscillator means further comprises:
an integrator responsive to a second phase error signal for providing a second integrated phase error signal;

a second summing amplifier (SUM2) for adding said second integrated phase error signal and said second reference signal (Fm2) to provide a second composite variable offset frequency control signal;

a first voltage controlled oscillator (VC02) responsive to said second control signal for providing a second offset frequency signal (F2); and a second voltage controlled oscillator responsive to said first composite variable offset frequency control signal for providing a second variable offset frequency signal;

a phase detector responsive to said first offset frequency signal (F1) and to said first variable offset frequency signal for providing said first phase error signal; and a second acousto-optic coupler (A02) responsive to said second single frequency ray (F0) and to said second variable offset frequency signal for upshifting the frequency of said second single frequency ray by a frequency equal to the frequency of said second voltage controlled oscillator output signal and for providing said counterpropagating light ray (FCCW) to said passive resonator cavity.

16. The passive ring resonator of claim 13 wherein said detector means for detecting a first offset frequency error signal and for detecting a second offset frequency error signal further comprises:
first and second detector diodes and respective first and second detector amplifiers, each detector amplifier being electrically coupled to a respective detector diode and both amplifier and diode being biased to provide respective first and second offset frequency error signals;
said first detector diode being coupled to be responsive to a sample of said propagating light beam and to provide a detected first offset frequency error signal; and
said second detector diode being coupled to be responsive to a sample of said counterpropagating light beam and to provide a detected second offset frequency error signal, each respective detected offset frequency error signal being amplified by a respective detector amplifier to provide a respective offset frequency error signal.

17. The passive ring resonator of claim 13 wherein said cavity servo means further comprises:

first and second lock-in amplifiers, each lock-in amplifier being responsive to a respective reference signal, (Fm1, Fm2) and to a respective first and second offset frequency error signal, for demodulating, filtering and integrating each respective first and second offset frequency error signal to provide respective first and second filtered and demodulated offset frequency error signals; and a first and second servo integrator;

said first integrator coupled to receive said first filtered and demodulated offset frequency error signal and to provide said first control signal; and said second integrator coupled to receive said second filtered and demodulated offset frequency error signal and an output to provide said second control signal.

18. A balanced dual servo passive ring resonator gyroscope having enhanced stability and sensitivity comprising:

a first and second fixed frequency reference signal generator to provide respective first and second reference signals, each reference signal having a fixed reference frequency (Fm1, Fm2);

a single piece body having laser and passive resonator cavities;

a laser means having a power source, said laser means using said laser resonator cavity containing a lasing medium, said laser means having a laser cavity servo path length adjusting means for providing a single frequency light ray (F0) from a transmitting aperture;

said passive resonator cavity being a passive high Q evacuated cavity having a path length adjusting means responsive to a passive cavity path length servo signal for adjusting closed optical path length of the passive resonator, the sensitive axis of said passive ring resonator gyroscope being essentially normal to the plane of said passive resonator cavity closed optical path;

means responsive to said single frequency light ray for splitting said single frequency light ray (F0) into respective first and second single frequency light rays;

a first voltage controlled oscillator means responsive to said first single frequency light ray, to a first control signal, and to said first reference signal (Fm1) for frequency shifting the center frequency of the first single frequency light ray center frequency by a first variable offset frequency (F1+Fm1) to form a propagating light source to supply a propagating light ray (FCW);

said propagating light ray having a center frequency, said propagating light ray center frequency being frequency shifted by said first offset frequency (F1) and frequency modulated by said first reference signal Fm1;

coupling means for coupling said propagating light ray into said passive resonator cavity to form a propagating light beam (FCW);

second voltage controlled oscillator means responsive to said second single frequency light ray, to a second control signal, and to said second reference signal (Fm2) for frequency shifting the center frequency of the second single frequency light ray by a second variable offset frequency (F2+Fm2) to form a counterpropagating light source to supply a counterpropagating light ray (FCCW);

said counterpropagating light center frequency being frequency shifted by a second offset frequency signal (F2) and frequency modulated by said second reference frequency (Fm2);

coupling means for coupling said counterpropagating light ray (FCCW) into said passive resonator cavity to form a counterpropagating light beam (FCCW);

a detector means optically coupled to sample said propagating light beam (FCW) for detecting a first offset frequency error signal at said first reference signal frequency (Fm1) and to provide a first offset frequency error signal, said detector means also being optically coupled to sample said counterpropagating light beam (FCCW) for detecting a second offset frequency error signal at said second reference signal frequency (Fm2) to provide a second offset frequency error signal;

cavity servo means responsive to said first and second reference signals Fm1, Fm2 and to said respective first and second offset frequency error signals from said detector means for providing, said first control signal to said first voltage controlled oscillator means for frequency shifting the center frequency of the propagating light ray by a first variable offset frequency (F1+Fm1) to control and maintain said propagating light beam (FCW) in said passive resonator at peak resonance and for providing said second control signal to said second voltage controlled oscillator means for frequency shifting the center frequency of the counterpropagating light ray by a second variable offset frequency (F2+Fm2) to control and maintain said counterpropagating light beam (FCCW) in said passive cavity at peak resonance;

a first adder means responsive to said first and second control signals for algebraically adding said first and second control signals to provide a passive cavity difference servo signal;

an integrator means responsive to said passive cavity difference servo signal for providing an integrated passive cavity difference servo signal;

said passive cavity having a passive cavity path length adjusting means responsive to a DC bias signal plus said passive cavity difference servo signal for adjusting said passive cavity to be substantially resonant at the frequency of said single frequency light source in the absence of a body rate input and for shifting the resonant frequency of the passive resonator cavity to a frequency centered between said propagating beam (FCW) and said counter propagating beam (FCCW);

output counter means for measuring and outputting the frequency difference between said first variable offset frequency (F1) and said second variable offset frequency (F2), the measured frequency difference representing the difference in frequency due to an input gyro body rate about said gyro sensitive axis.

* * * * *